(12) United States Patent
Nonoyama et al.

(10) Patent No.: US 6,342,983 B1
(45) Date of Patent: Jan. 29, 2002

(54) RECORDING TAPE MEDIUM, AND APPARATUS FOR RECORDING DATA ON AND RECORDED DATA FROM RECORDING TAPE MEDIUM BY HELICAL SCANNING SYSTEM

(75) Inventors: Hideki Nonoyama; Tomonao Uchida, both of Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/191,740

(22) Filed: Nov. 13, 1998

(30) Foreign Application Priority Data

Nov. 17, 1997 (JP) .............................................. 9-315697

(51) Int. Cl.⁷ .............................. G11B 5/09; G11B 5/584
(52) U.S. Cl. ...................................... 360/48; 360/77.12
(58) Field of Search .............................. 360/48, 64, 71, 360/73.01, 72.1, 73.04, 77.12

(56) References Cited

U.S. PATENT DOCUMENTS 6,134,073 A * 10/2000 Langford et al. ........ 360/77.03

FOREIGN PATENT DOCUMENTS

| EP | 0 540 352 A2 | 5/1993 |
| EP | 0 639 927 A2 | 2/1995 |
| EP | 0 772 193 A2 | 5/1997 |
| EP | 0 844 615 A2 | 5/1998 |
| WO | WO 84/02221 A1 | 6/1984 |
| WO | WO 91/14266 A1 | 9/1991 |
| WO | WO 93/17419 A1 | 9/1993 |
| WO | WO 93/17423 A1 | 9/1993 |

* cited by examiner

*Primary Examiner*—Regina Y. Neal
(74) *Attorney, Agent, or Firm*—Frommer Lawrence & Haug LLP; William S. Frommer; Dexter T. Chang

(57) ABSTRACT

A track format is prescribed so that an ST-AFN indicating the AFN of the streaming start position be written on each track, and at the time of reference value measurement, an append point is detected by monitoring coincidence between the AFT and the ST-AFN on the scanned track. And, on the basis of the detected append point, a reference value is measured for each streaming recorded area, and this reference value is held matched with the recording positional information of the streaming recorded area.

16 Claims, 21 Drawing Sheets

| PACK ITEM NO. 4 | AFN (Absolute Frame Number) | NUMBER ASSIGNED TO FRAMES RECORDED ON TAPE SEQUENTIALLY FROM LEADING EDGE OF TAPE |
|---|---|---|
| PACK ITEM NO. 0 (SC0-SC2) | GN (Group Number) | NUMBER ASSIGNED TO FRAMES RECORDED ON TAPE SEQUENTIALLY FROM LEADING EDGE OF TAPE |
| PACK ITEM NO. 0 (SC3) | LFN (Logical Frame Number) | NUMBER ASSIGNED TO FRAMES IN ONE GROUP 0:amble,1-22:Data,23:ECC |
| PACK ITEM NO. 7 | ST-AFN | AFN OF FRAME RECORDED FIRST WHEN STREAMING IS STARTED |

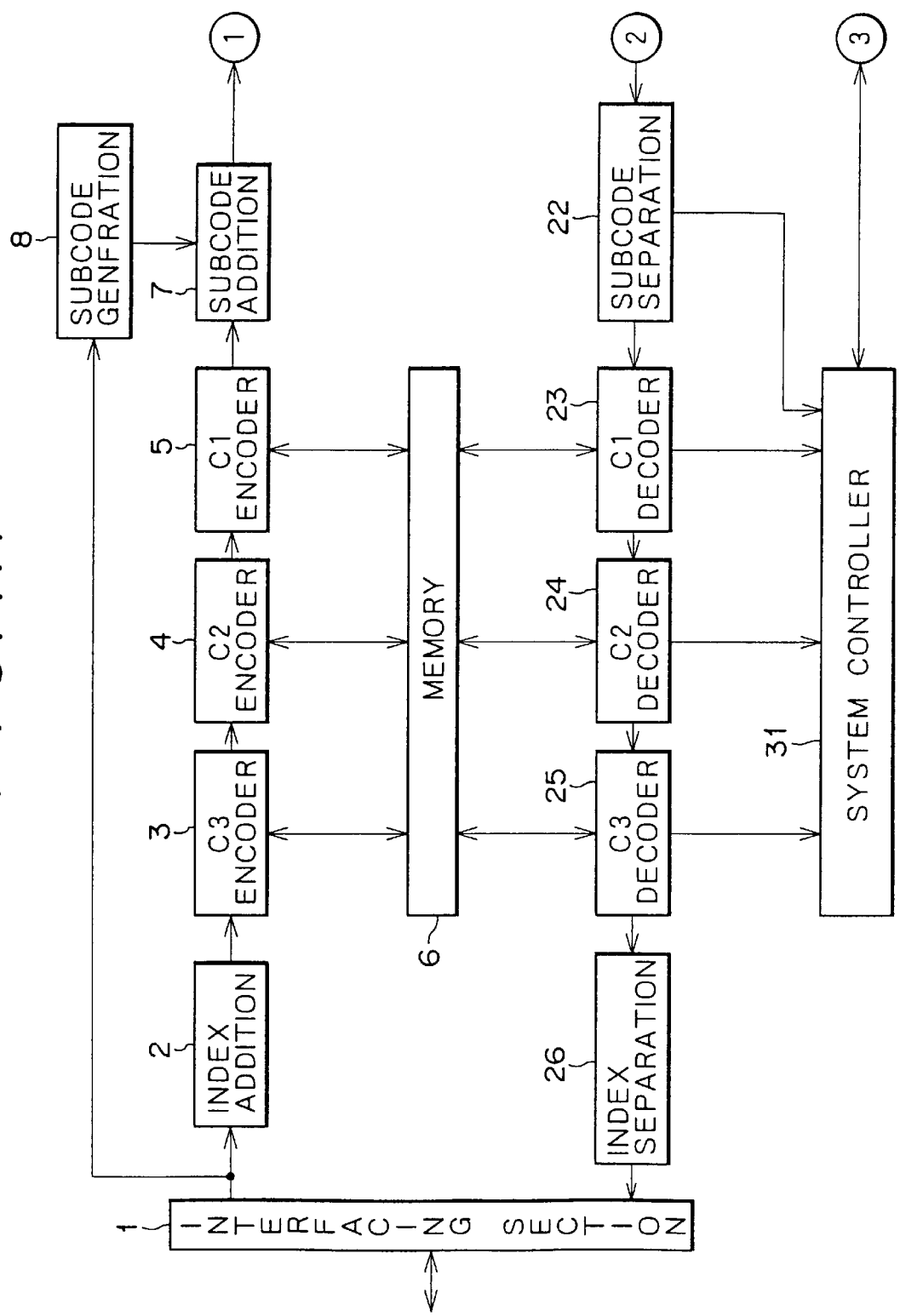

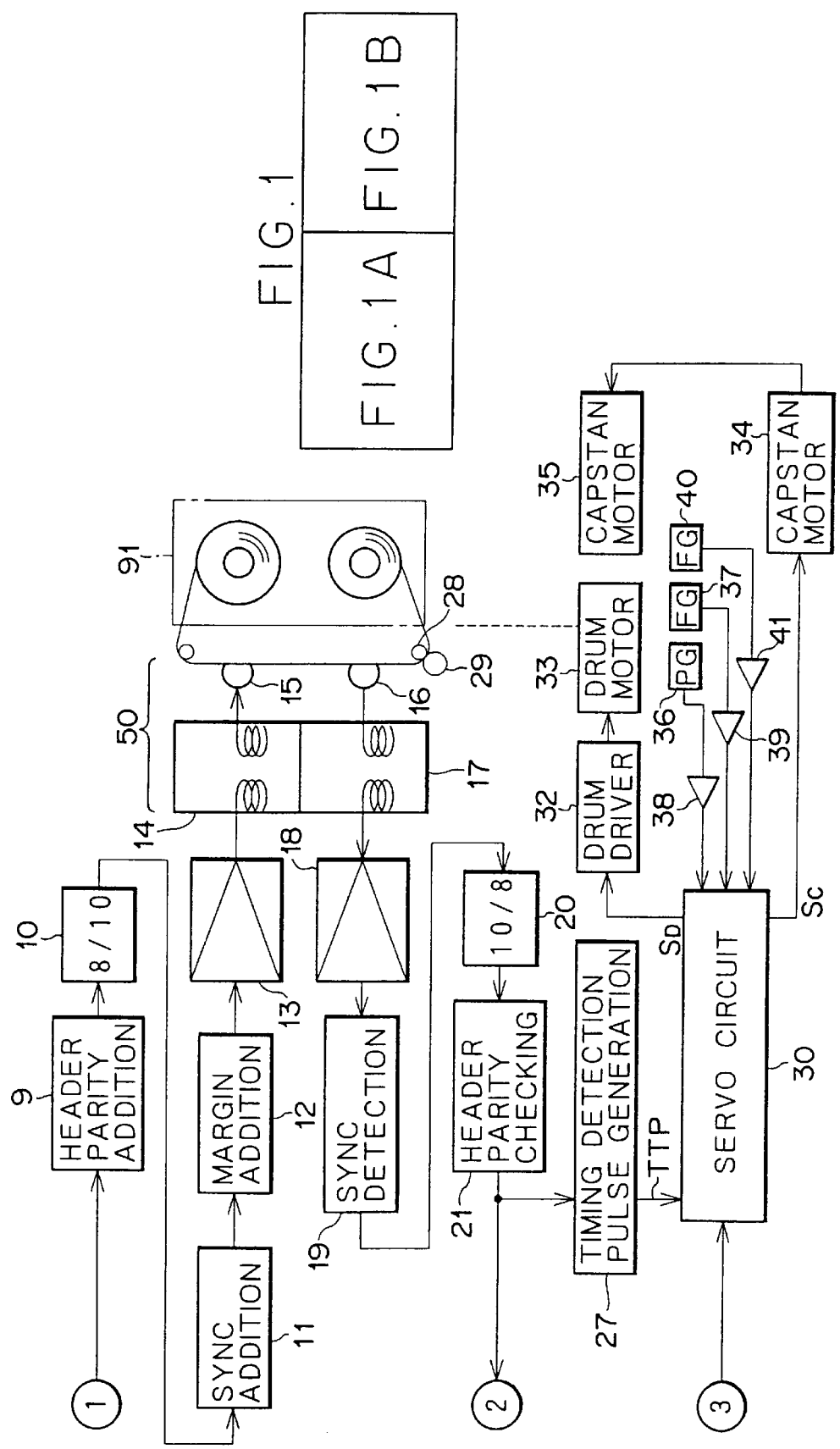

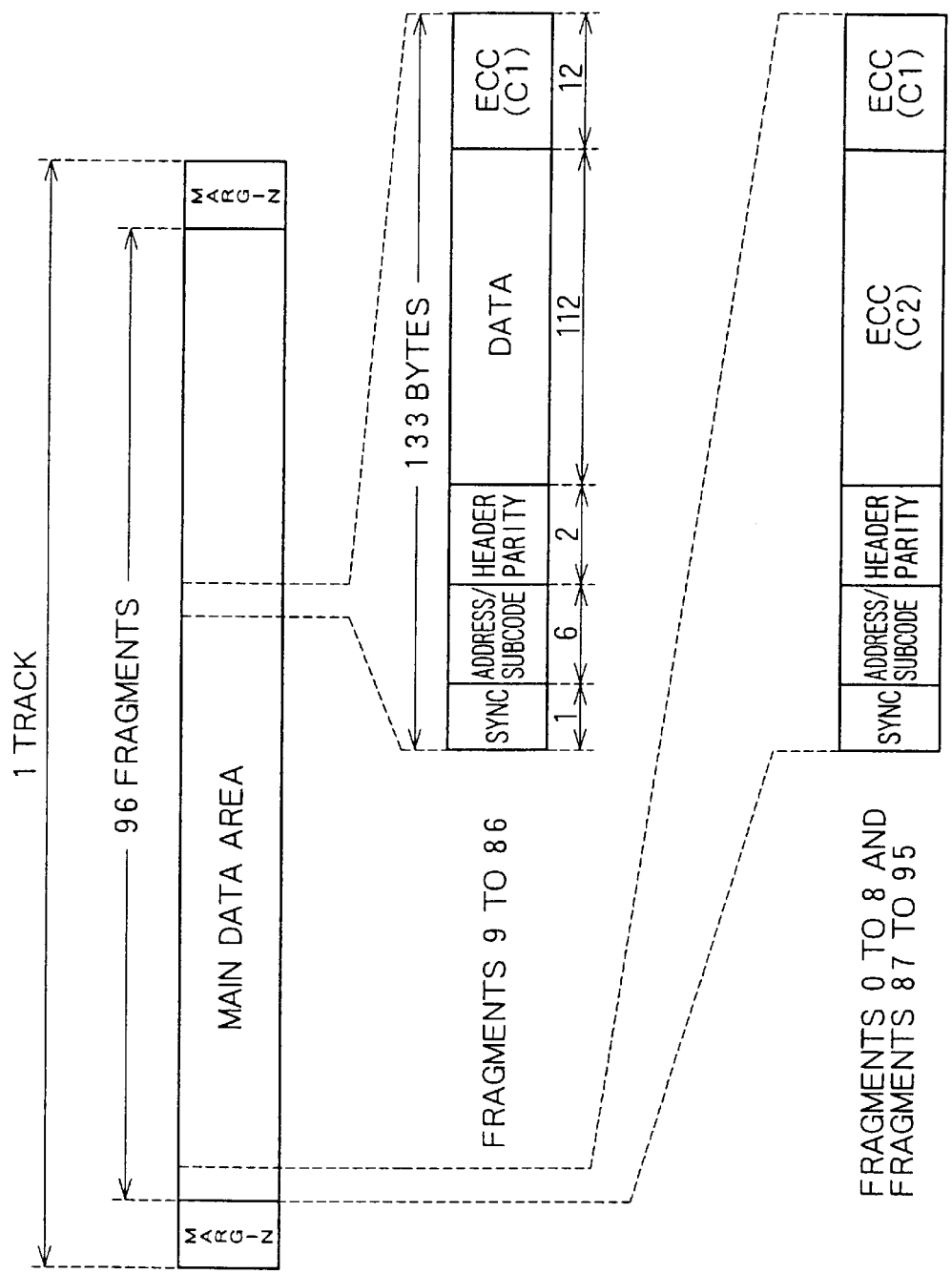
F I G. 10A  F I G. 10B  F I G. 10C

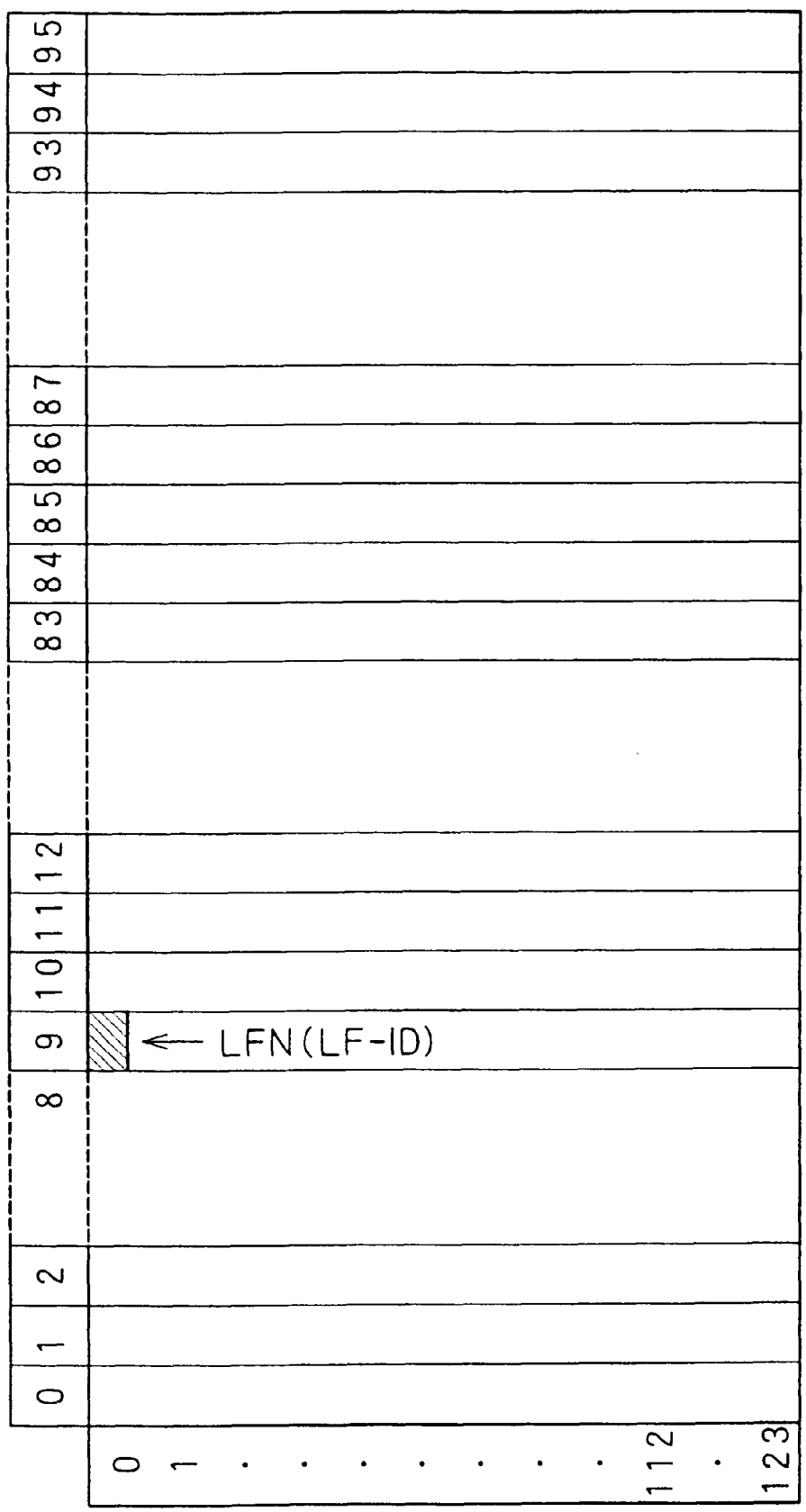

FIG. 13

| | | |
|---|---|---|
| PACK ITEM NO. 4 | AFN (Absolute Frame Number) | NUMBER ASSIGNED TO FRAMES RECORDED ON TAPE SEQUENTIALLY FROM LEADING EDGE OF TAPE |
| PACK ITEM NO. 0 (SC0-SC2) | GN (Group Number) | NUMBER ASSIGNED TO FRAMES RECORDED ON TAPE SEQUENTIALLY FROM LEADING EDGE OF TAPE |
| PACK ITEM NO. 0 (SC3) | LFN (Logical Frame Number) | NUMBER ASSIGNED TO FRAMES IN ONE GROUP 0:amble,1-22:Data,23:ECC |
| PACK ITEM NO. 7 | ST-AFN | AFN OF FRAME RECORDED FIRST WHEN STREAMING IS STARTED |

F I G. 21
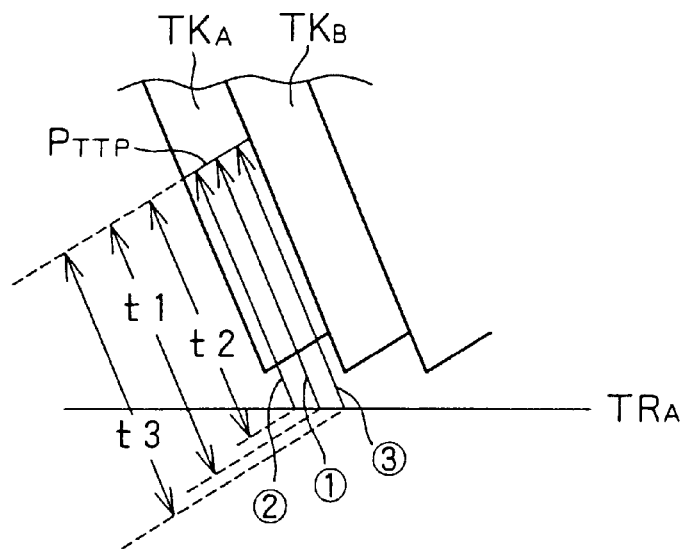
F I G. 22
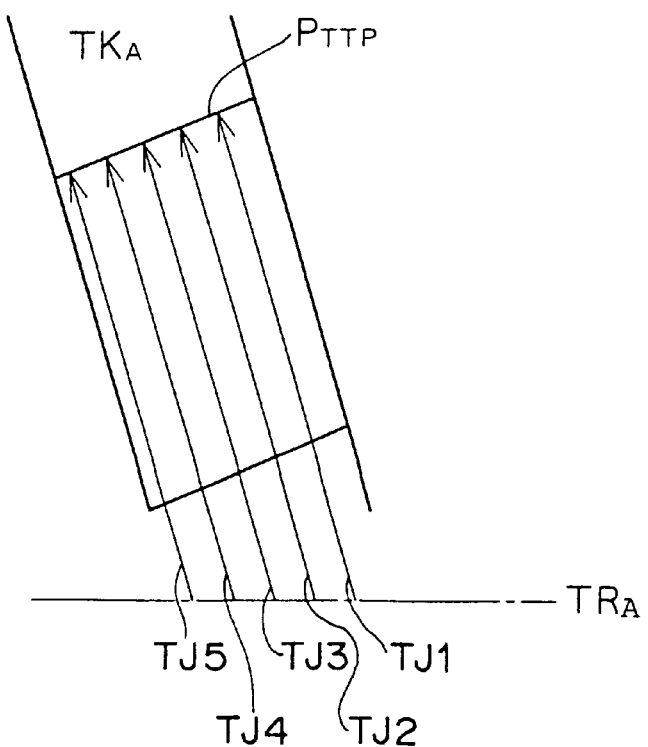

RECORDING TAPE MEDIUM, AND APPARATUS FOR RECORDING DATA ON AND RECORDED DATA FROM RECORDING TAPE MEDIUM BY HELICAL SCANNING SYSTEM

BACKGROUND OF THE INVENTION

1. Field of the Invention

The present invention relates to a recording apparatus for recording data on a recording tape medium compatible with a so-called timing ATF (Automatic Track Following) servo system as tracking servo control, a recording tape medium on which recording is to be done by this recording apparatus, and a measuring apparatus for measuring a reference value for timing ATF servo in reproducing data from this recording tape medium.

2. Description of the Related Art

Digital data storage equipment (DDS equipment) enabled to record and reproduce computer data has been developed by using a digital audio tape player (DAT recorder/player) for recording and reproducing digital audio data on and from a magnetic tape, for instance, or a DAT system similarly using a magnetic tape, as a data storage system for the computer.

In these apparatuses, high density recording is made possible by causing them to perform recording/reproducing scanning by a helical scanning system using magnetic heads on a rotary drum by having a magnetic tape run in a state wherein the tape is wound round the rotary drum in a lap angle of, for instance, 90° and at the same time rotating the rotary drum.

In this case, inclined tracks TKA and TKB, for instance, are formed on the tape as shown in FIG. 20. The inclined tracks TKA and TKB are tracks formed by a pair of heads (head A and head B) mounted on the rotary drum and differing in azimuthal direction, i.e. tracks considered to have inverse azimuths to each other.

Incidentally, whereas the magnetic heads should accurately trace tracks TK on the tape during reproduction, systems to control this tracking include, for example, tracking servo control operation, which is known as timing ATF system, for DDS reproducing apparatuses.

This timing ATF system measures the length of time (tracking detection period) from the reference phase position of the rotary drum until a prescribed signal (timing detection signal) is detected from a track by a head, and the measured value is compared with a reference value, with the error equivalent being used as servo error information.

And, it is caused to be reflected in the tape running speed by controlling the rotating speed of the capstan motor for tape running according to that servo error information. Thus the relative speed with respect to the rotating speed of the drum and the running speed of the tape is adjusted by regulating the running speed of the tape so as to achieve a satisfactory tracking state.

Suppose, for instance as illustrated in FIG. 21, that the phase position of the rotary drum is the reference position when the scanning position of the magnetic head relative to a certain track has come to a positional state corresponding to a line (timing) indicated as TRA in the figure. Since the configuration is such that, at the time when the reference phase position is arrived at during the rotation of the drum, a pulse signal is generated from a pulse generator (PG) arranged on the drum motor, for example, the timing TRA at which the rotary drum has come to the reference phase position can be detected. After that, as the magnetic head comes into contact with the magnetic tape and scans the track TKA, a timing detection signal is detected in a prescribed position PTTP on the track as reproduced data. This timing detection signal is supposed to provide a pulse in the position PTTP predetermined on the basis of a sync signal in the data and the detection of an address.

Whereas three ways of scanning differing in tracking phase state relative to the track TKA are shown here as ①, ② and ③ in the figure, the period from the timing of the reference phase position of the rotary drum (the position of the line TRA) until the timing at which the position PTTP is reached (the tracking detection period) varies in length with the way of scanning, ①, ② or ③, as indicated by t1, t2 and t3.

For the tracking detection period, the time length t1, which is obtained when the magnetic head is in a satisfactory tracking state for the track TK, i.e. in a state wherein the center of the track TKA is traced as in ①, is preset and, therefore, if scanning as in ① is performed and the time length t1 is measured as the tracking detection period while under tracking servo control, the measured value and the reference value will coincide with each other. Thus, in this case, there is no error between the measured value and the reference value, and a satisfactory tracking state is found to be achieved. On the other hand, if scanning is performed in a tracking phase state as in ② or ③, the measured value of the tracking detection period will be t2 or t3, and there will be an error compared with the reference value. In this case, there is a tracking lag equivalent to that error, and servo control toward a just tracking state can be executed by causing this to be reflected in the tape running speed.

Whereas the reference value should be identified in advance in executing such timing ATF servo, this reference value, as stated above, is the length of time from the timing of the reference phase position of the rotary drum in the just tracking state until the timing at which a timing detection signal is obtained. As the timing detection signal is generated in accordance with, for instance, the detection of a sync signal at a prescribed address on the track, its position PTTP is fixed on each track of various tapes, but in practice mechanical errors and the like in various recording apparatuses and reproducing apparatuses inevitably give rise to positional lags between a plurality of tracks formed even in a single round of continuous recording. For this reason, when certain file data are to be reproduced with a DDS reproducing apparatus, the reference value on that particular tape (that file data track) should be measured in advance of executing the reading of those data to be reproduced.

For measuring this reference value, such processing is accomplished that scanning of the track is executed in various tracking phase states to calculate an average, for example, from the tracking detection periods measured in those scanning procedures and to use it as the reference value.

Its image is shown, for example, in FIG. 22. If, as illustrated, the track TKA is scanned in a plurality of different tracking phase states, such as TJ1 to TJ5 for instance, and an average is calculated from the different tracking detection periods measured during the scanning procedures, a tracking detection period in the approximate vicinity of the tracking phase state TJ3 in the figure will be obtained. This can be regarded as the tracking detection period substantially in the vicinity of the just tracking state, and accordingly this is used as the reference value.

Incidentally, here is considered a case in which a plurality of recorded areas each formed by one continuous recording operation known as streaming, i.e. execution of a series of actions from the start of recording until the end of recording without stopping the running of the magnetic tape on the way (hereinafter such recording areas may also be referred to as "streaming recorded areas") are linked to form a recorded area on the magnetic tape.

In this case, in streaming recorded areas each formed by a single round of streaming, the position of the track recorded on the magnetic tape may shift from one streaming recorded area to another, affected by a difference in recording apparatus or, even if recording is performed by the same recording apparatus, by various conditions including mechanical action errors or temperature variations at the time of recording.

Here even if, for instance, a common value is set, as the reference value for the above-mentioned timing ATF servo, by mere scanning for a recorded area formed by linking of a plurality of streaming recorded areas such as described above, this reference value will not necessarily be an appropriate reference value for every streaming recorded area. As a consequence, when tracking is actually executed at the time of reproduction on the basis of a reference value set for timing ATF servo as described above, tracking may not be appropriately executed in some streaming recorded area or areas. Thus, as the reference value for timing ATF servo, an appropriate value for each streaming recorded area should be set.

A method to set a reference value for timing ATF servo suitable for each streaming recorded area conceivably is, for example, to distinguish the section (equivalent to detection of an append point) for each streaming recorded area by detecting a data pattern inherent among streaming recorded areas (e.g. a pattern of arrangement of prescribed data units), obtained in accordance with the format of the DDS reproducing apparatus, while scanning the magnetic tape. Then, a reference value may be measured for each of the streaming recorded areas distinguished.

However, when scanning a magnetic tape to measure a reference value, the magnetic tape is run at a prescribed speed other than any integral multiple of the regular speed so that scanning can take place in as even a phase position as possible relative to each of the plurality of tracks in a given section of tape running. There is a circumstance that, because the magnetic head appropriately traces the track when scanning for reference value measurement, data contents inherent between streaming recorded areas cannot always be read out appropriately. If, as a result, a data pattern inherent between streaming recorded areas, for instance, cannot be distinguished, a reference value will be measured with the linked plurality of these streaming recorded areas being looked upon as a single streaming recorded area.

Thus, in the stage of scanning a magnetic tape to measure a reference value, it is required to distinguish each streaming recorded area section at as high a level of accuracy as possible.

SUMMARY OF THE INVENTION

According to the present invention, there is provided a recording tape medium, whereon data are recorded in prescribed units of data each corresponding to a track formed by a helical scanning system, on which to be further recorded are: first track identifying information for identifying individual tracks; and second track identifying information for identifying, with respect to the tracks each formed for a unit of recording operation, the track on which the pertinent unit of recording operation started.

According to the invention, there is also provided a recording apparatus for recording data in prescribed units of data each corresponding to a track recorded on a recording tape medium by a helical scanning system, equipped it with: first track identifying information generating means for generating first track identifying information for identifying individual tracks; second track identifying information generating means for generating second track identifying information for identifying the track on which a unit of recording operation started in a state wherein the recording tape medium does not stop running on the way; and unit data forming means for forming the units of data so disposed as to insert the first track identifying information and second track identifying information including information regarding the track position to which each unit of data corresponds into the units of data.

According to the invention, there is further provided a measuring apparatus applicable to an apparatus for measuring, when data are reproduced from a track recorded on a recording tape medium by a helical scanning system, a tracking detection period from the time a rotary drum provided with a reproducing head is in a reference phase position in a period of one rotation until the time the head performs reproduction in a prescribed position on the track; generating a servo control signal for a relative speed with respect to the running speed of the tape and the rotating speed of the rotary drum by comparing this measured value of the tracking detection period with a preset reference value; performing tracking control during reproduction on the basis of this servo control signal; and measuring the reference value, wherein, on each track of the recording tape medium are recorded first track identifying information for identifying individual tracks and second track identifying information for identifying the track on which the pertinent unit of recording operation started in a state wherein the recording tape medium does not stop running on the way, the measuring apparatus being provided with tape running control means for causing the recording tape medium to run at a prescribed running speed appropriate for obtaining the reference value; reference value setting means for sampling the measured values of a plurality of the tracking detection periods obtained in a state in which the recording tape medium is run, calculating the tracking detection period in a just tracking phase state on the basis of this plurality of measured values, and setting the result of calculation as the reference value; unit recorded area identifying means for identifying sections of unit recorded areas recorded by the unit recording action on the basis of the first track identifying information and the second track identifying information read out of the recording tape medium in a state wherein the recording tape medium is run; and control means for causing a setting action to be executed by the reference value setting means for each identified unit recorded area.

According to the above-described configuration, the first track identifying information by which tracks can be identified and the second track identifying information by which tracks, each of which is formed for a round of streaming of recording accomplished in a state wherein the recording tape medium does not stop running on the way, are identified are recorded on a tape recording medium on a track-by-track basis, and when, for instance, a reference value for timing ATF servo is to be measured, sections of streaming recorded areas (append points) are identified on the basis of the aforementioned first and second track identifying information. Since, according to this, detection is carried out while monitoring their continuity on the basis of serial numbers assigned to recording tracks, sections of streaming recorded areas can be detected more reliably than when only the pattern of arrangement of frame (track) numbers in recorded unit data formed by a prescribed number of tracks is relied upon.

BRIEF DESCRIPTION OF THE DRAWINGS

FIG. 1 is a block diagram of a recording/reproducing apparatus, which is a preferred embodiment of the present invention.

FIGS. 10A to 10C are diagrams for describing the track format.

FIG. 12 is a diagram for describing the inserting position for the LFN(LF-ID) in the main data area.

FIG. 13 is a diagram for describing the definitions of data contents to be set in the pack item area.

FIG. 21 is a diagram for describing the timing ATF action.

FIG. 22 is a diagram for describing the reference value setting timing ATF.

DETAILED DESCRIPTION OF THE PREFERRED EMBODIMENT

A preferred embodiment of the present invention will be described below.

Although a DDS recording/reproducing apparatus is supposed in this example, to go into further detail, four versions of so-called DDS systems have been developed including DDS4 in addition to DDS, DDS2 and DDS3. The DDS reproducing apparatus in this example is supposed to be compatible with DDS4, which uses a format making possible recording in higher density than DDS, DDS2 or DDS3.

Incidentally the ensuing description will be made in the following sequence.
1. Format
2. Background leading to the present invention
3. Configuration of the recording/reproducing apparatus
4. Configuration for timing ATF
    (4-1. Circuit configuration for timing ATF control)
    (4-2. Setting of tape running speed for reference value measurement)
    (4-3. Outline of reference value measurement)
    (4-4. Processing for recording)
    (4-5. Processing for measurement of timing ATF servo reference value)
    (4-6. Processing for reproduction)

1. Format

First, the track format of the DDS4 system will be described with reference to FIGS. 9 to 13.

Figure 9:
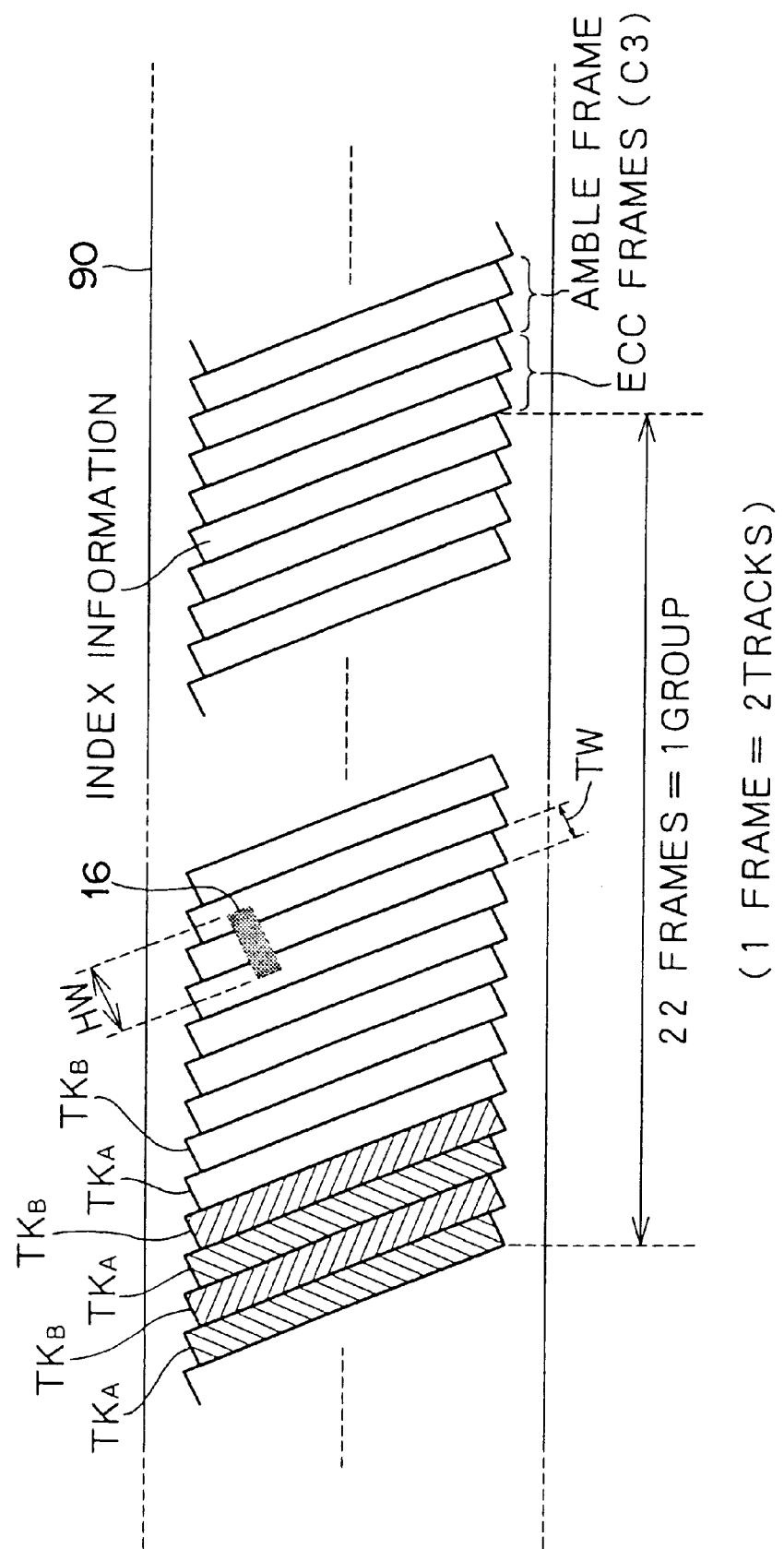
FIG. 9 is a schematic diagram of tracks formed on a tape.

FIG. 9 illustrates tracks of a helical scanning system formed on a magnetic tape 90.

Each track is formed as a track having a track width TW by so-called azimuth beta recording by a recording head not shown. Adjoining tracks have inverse azimuths to each other. That is to say, tracks TKA in one azimuth direction and tracks TKB in the other azimuth direction are alternately formed.

During reproduction, a track is scanned by a reproducing head 16. Although the head width HW of the reproducing head 16 is supposed to be greater than the track width TW, cross talk from adjoining tracks is prevented by the so-called azimuth effect.

In a DDS format, a pair of adjoining tracks TKA and TKB are called one frame, and 22 frames constitute a unit called a group. After a group, an ECC frame, which is a single frame equivalent, may be provided, and where an ECC frame is provided, 23 (=22+1) frames are deemed to constitute one group. After the ECC frame an amble frame or frames may be provided, though the number of such amble frames is not prescribed, and sometimes no amble frame is provided.

And the ECC frame and amble frame(s) would define the boundary of a group on the tape 90.

Incidentally, in each group, index information for classifying a series of data is added to the final frame of the group.

The above-mentioned group is supposed to be the smallest recording unit in the DDS4 format. Therefore, one recording operation known as streaming can be accomplished group by group at its smallest.

The data format in one track is illustrated in FIGS. 10A to 10C.

In one track, margin areas are formed at both ends as shown in FIG. 10A, and the area sandwiched between these margin areas is supposed to be the main data area.

The main data area is divided into 96 fragments, to which fragment addresses from 0 to 95 are assigned. One fragment consists of 133 bytes, and its contents are illustrated in FIGS. 10B and 10C.

In each of the 78 fragments whose fragment addresses are 9 to 86, a sync signal area of one byte is provided at the leading edge, where a sync signal taking a prescribed pulse form is recorded.

Following the sync signal area, there are provided a six byte address and subcode area. Here a fragment address is recorded in one byte, and a subcode is recorded in five bytes.

Then two bytes make up a header parity area, and the further following 112 bytes make up a data area. In this data area, actual data are recorded. The final 12 bytes of the fragment make up an ECC area.

In this ECC area is recorded the so-called C1 correction code. The C1 correction code serves as the error correction code for data in the fragment, and thus error processing is completed on a fragment-by-fragment basis.

In each of the 18 fragments whose fragment addresses are 0 to 8 and 87 to 95, shown in FIG. 10C, a sync signal area, an address/subcode area, a head parity area and an ECC area are provided as in the fragment of FIG. 10B. However, the 112 bytes which made up a data area in the fragment of FIG. 10B make up an ECC area, where a C2 correction code is recorded.

The C2 correction code serves as the code for a correction sequence completed within one track.

Incidentally, a C3 correction code is further added as another correction code. This is recorded in the ECC frame shown in FIG. 9. This correction code is a code of a correction sequence completed within one group.

If an error situation is confirmed with the C1 correction code and the C3 correction code, it can be confirmed in what part of a track the error has occurred, but the location of error occurrence within a track cannot be confirmed from an error situation according to the C2 correction code, because the C2 correction code is recorded under interleave within the track.

Figure 11:
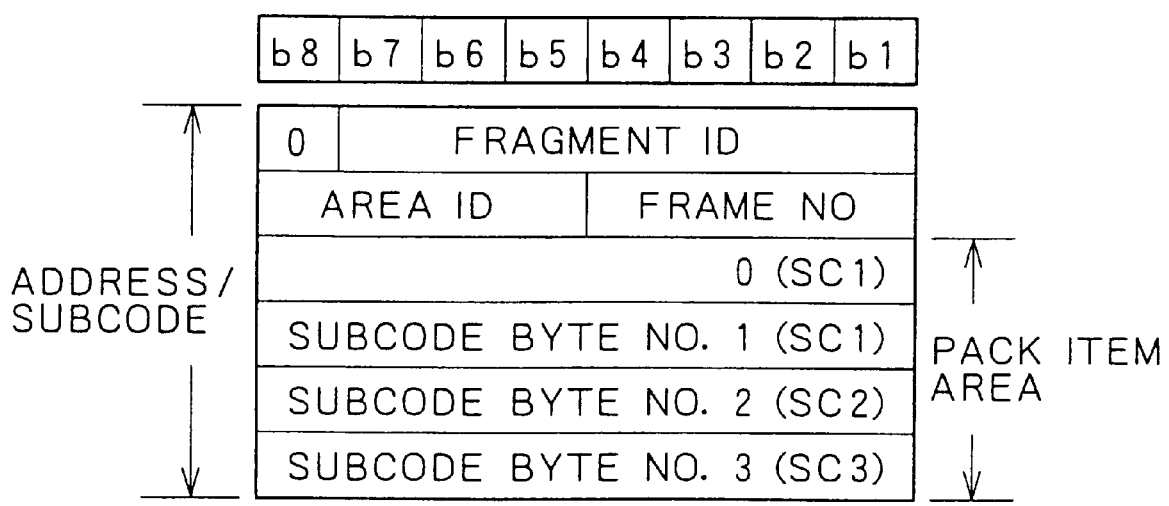
FIG. 11 is a diagram for describing the data structure in the address/subcode area as a track format.

FIG. 11 illustrates the data structure (six bytes) of the address/subcode area in the fragment of FIGS. 10B and 10C.

In the one byte area of the top line (line 1) of this address/subcode area is set "0" for the eighth bit, and in the next seven bits, from the seventh to the first, is set a fragment ID for identification of the current fragment.

The four leading bits of line 2 are supposed to be an area for area IDs to indicate by the actually set value which of the device area, reference area, system area, data area and EOD (End of Data) area the current fragment, for instance, belongs. The frame number to which the current fragment belongs is set in the four leading bits of line 2.

Lines 3 to 6 re supposed to be a pack item area, and areas of one byte each on lines 3 to 6 are supposed to be the areas of subcode byte number 0 (SC0), subcode byte number 1 (SC1), subcode byte number 2 (SC2) and subcode byte number 3 (SC3). In the pack item area consisting of these SC0 to SC3 is stored one of 16 kinds of data contents of pack item numbers 0 to 15 in accordance with a prescribed rule provided for by the format.

For instance in the data area, eight kinds of pack item contents, pack item numbers 0 to 7 out of pack item numbers 0 to 15, are prescribed to be allocated to 96 fragments constituting one track; if, for example, the allocation of pack item numbers 0 to 7 is successively repeated for each of the aforementioned 96 fragments, the information of pack item numbers 0 to 7 will be recorded 12 times, as indicated by 96/8=12, on one track (96 fragments).

What are supposed to be relevant to this embodiment out of the definitions of data contents to be set with respect to the aforementioned pack item numbers are shown in FIG. 13.

An AFN (Absolute Frame Number) is set as the pack item number 4. AFNs are serial numbers assigned to frames recorded on a magnetic tape, and a frame can be identified by this AFN information.

Incidentally, since one frame is formed of two adjoining tracks different in azimuth from each other, AFN information can be looked upon as identifying information for specifying tracks, if the viewpoint that one AFN indicates a pair of tracks to be recorded by heads of mutually different azimuths is taken.

In the three byte areas of SC0 to SC2 within pack item number 0 is set a GN (Group Number). GNs are serial numbers assigned to groups recorded on a magnetic tape, and identification on a group-by-group basis can be accomplished according to this GN information.

In the remaining area of SC3 within pack item number 0 is set an LFN (Logical Frame Number). An LFN, also called an LF-ID, is supposed to be a number assigned to a frame within a group; when the current frame is supposed to be an amble frame, a number indicating "0" is assigned, or when the current frame is a data frame, a number indicating one of 1 to 22 is assigned according to its position in the recording sequence within the group. Furthermore, if the current frame is supposed to be an ECC frame, a number indicating 23 is assigned.

And, as a characteristic of this embodiment, for example ST-AFN is stored as pack item number 7, which is supposed to be undefined in the DDS3 format. ST-AFT denotes the AFN of the frame first recorded at the start of streaming. Therefore, a common ST-AFN is recorded for every pack item number in each of the tracks constituting one streaming recorded area recorded by one round of streaming. Incidentally, what pack item number corresponds to the pack item area of what fragment is supposed to be prescribed by the format and, therefore, in accordance with the correspondence with the fragment ID shown in FIG. 11, the pack item number stored for the pack item area of the current fragment is supposed to be identifiable.

In this embodiment, detection of the append point at the time of measuring the reference value for timing ATF servo is accomplished by utilizing the ST-AFN read out of the magnetic tape as will be described later.

Also, the LFN (LF-ID) is stored in the main data area on one track besides the aforementioned address/subcode area. FIG. 12 illustrates the data array structure of the main data area extracted from one track, wherein rows 0 to 95 are supposed to be fragments, and lines 0 to 123 are symbols (bytes). For the LF-ID to be inserted into the main data area, one byte is allocated for instance, and it is inserted into the position of the zeroth symbol of the ninth fragment in FIG. 12.

2. Background Leading to the Present Invention

Next, with the above-described format being presupposed, the background which led to the present invention will be described specifically.

Figure 18:
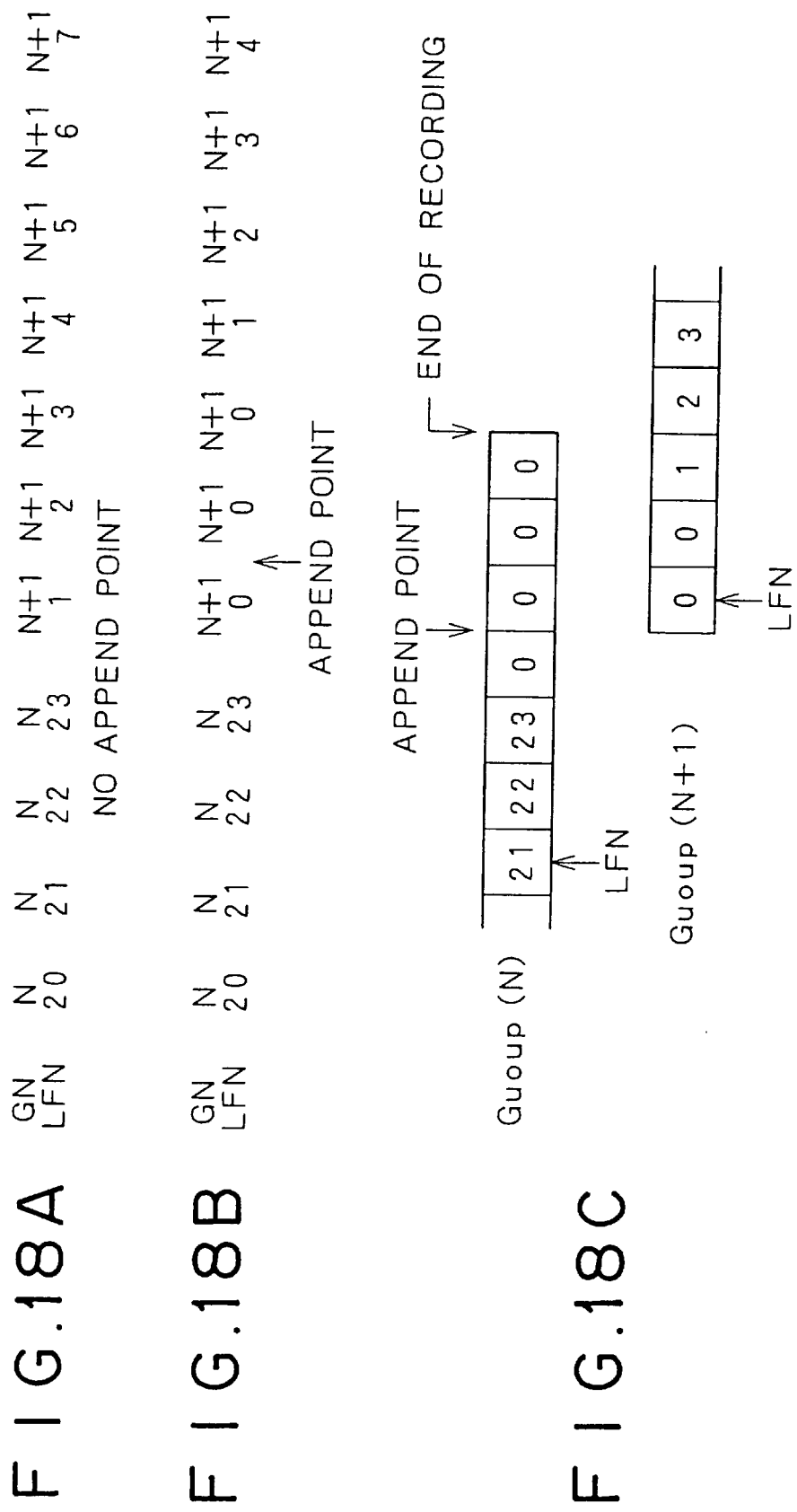
FIGS. 18A to 18C are diagrams for describing the append rule and frame patterns formed by an append.

FIG. 18A illustrates, as a state in which the group (N+1) is recorded following the group (N) by a single round of streaming, the vicinity of the linking position between the group (N) and the group (N+1) with reference to an LFN (see FIG. 13) on a frame-by-frame basis.

Incidentally, whereas accomplishment of recording, following the ending position of the group recorded by the preceding round of streaming, by the next round of streaming is called "append" and the boundary between the ending position of the final group recorded by the preceding round of streaming and the starting position of the first group recorded by the immediately following round of streaming is called the "append point," no append point exists in the aforementioned case of FIG. 18A, because the group (N) and the group (N+1) were recorded by one round of streaming.

Here in FIG. 18C is schematically illustrated the operation to end one round of streaming with the group (N) and start recording from the group (N+1) by the next round of streaming. The group structure is indicated by LFN (see FIG. 13) herein.

In order to end streaming for instance, a prescribed plurality of amble frames (LFN=0) are added to the final frame (in this case supposed to be LFN=23: ECC frame) recorded last in that round of streaming, and the streaming is terminated with the completion of the recording of these amble frames. FIG. 18C shows a state in which four amble frames are recorded.

Then, when recording is to be started from the group (N+1) by the next round of streaming, one frame of recorded amble is left behind the final frame of the group (N), which is the preceding group, and data recording by streaming is started from after that with a view to avoiding duplication with the main data of the group (N) among other purposes. And even at this start of streaming, recording is not immediately started immediately from the leading frame (LFN=1) of the group (N+1), but at least two amble frames are additionally recorded before this leading frame. FIG. 18C illustrates a case in which recording is started with two amble frames being added before the leading frame.

Incidentally, an append conforming to the above-stated rule is also called a "seamless append." Although non-seamless appends, whereby 29 or more amble frames are additionally recorded at the time of start of streaming, are also prescribed in the DDS4 format, detailed description is dispensed with here.

Where seamless appending is done as described above, the vicinity of the linking position between the group (N) and the group (N+1) will be as shown in FIG. 18B. Thus, three amble frames are consecutively formed between the final frame of the group (N) and the group (N+1). And of these three amble frames, the first and second amble frames are supposed to constitute the write-linking position by actual appending, i.e. the append point. To add, logically, the group (N) is deemed to include these three amble frames, and the group (N+1) is supposed to begin from the frame denoted by LFN=1. Therefore, as GN for the aforementioned three amble frames, GN=N+1 is set.

In DDS4, in order to ensure proper tracking control by the timing ATF system all the time, it is necessary to set a reference value for timing ATF servo matching each streaming recorded area. For this purpose, it would suffice to make the boundary of each streaming recorded area discernible by, for example, distinguishing the aforementioned append points during scanning at the time of measurement.

Then, where appending is to be performed in a certain drive in accordance with the rule explained with reference to FIG. 18C, it may be so disposed as to detect the position indicated in FIG. 18D in this drive if, for instance, a pattern of '23'→'0'→'0'→'0'→'1' is obtained as the LFN by monitoring the LFN obtained during scanning for measurement.

However, as will be described below, when a magnetic tape is to be scanned for measurement, the magnetic tape is run at a prescribed speed other than an integral multiple of the regular speed so that scanning can take place in as even a phase position as possible relative to each of the plurality of tracks in a given section of tape running. For this reason, the LFN is not always properly read out of every track. Therefore, failure to properly detect the frame pattern for an append area including the aforementioned append point is possible.

For instance, there will be no problem for detection of the frame pattern as an append area if the frame pattern is obtained by, for example, the simple appending action shown in FIG. 18C referred to above, but, if re-recording, known as the so-called "rewrite," is accomplished especially in a position close to the end of streaming, for instance as will be described next, the certainty of detection of the frame pattern as an append area will deteriorate.

In DDS4, by the so-called RAW (Read After Write), i.e. reproducing with the reproducing head, at the time of recording, data recorded at a timing of a few frames before, is accomplished, and it is judged on the basis of such reproduced data whether or not data recording was properly accomplished on a frame-by-frame basis. And if it is judged by RAW that data recording was not accomplished properly, it will be allowed, for instance, to repeat during streaming operation the recording of the frames whose recording was judged improper. Also on this occasion, before re-recording the frames whose recording was judged improper, it is prescribed that amble frames, known as "intermediate frames," in a prescribed number of 0 to 7 should be recorded. This is what rewrite is.

Figure 19:
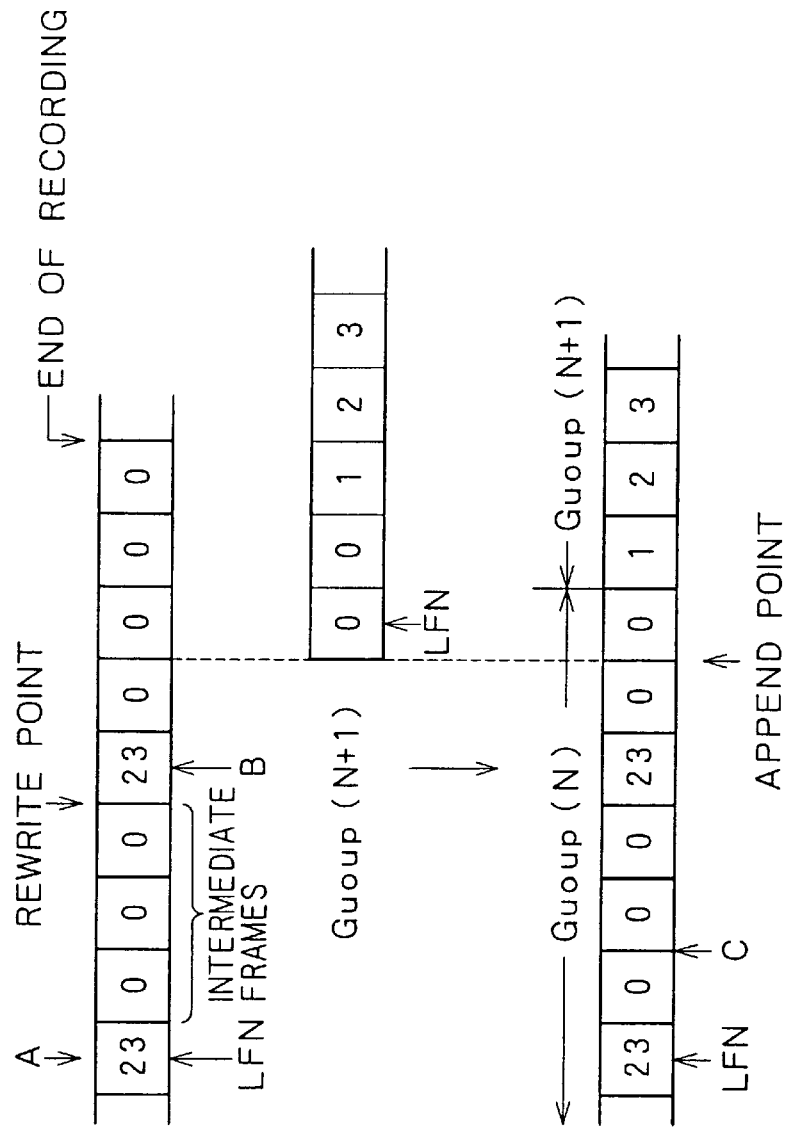
FIGS. 19A to 19C are diagrams for describing the rewrite rule and frame patterns formed by a rewrite.

FIG. 19A illustrates a case in which a rewrite action as described above is performed on the final frame (LFN=23) of the group (N), the final group in the streaming.

For instance, it is supposed that judgment according to RAW finds a recording error with respect to the final frame (LFN=23) of the group (N) recorded in the position indicated by arrow A. Whereas this causes the final frame (LFN=23) of the group (N) to be rewritten, here the three intermediate frames after the frame which arrow A points to are recorded and, after that, the final frame (LFN=23) of group N is recorded again as indicated by arrow B. And, for example, four amble frames are recorded after the final frame in the position of arrow B to terminate the streaming. In this case, the recording start position of the final frame in the position of arrow B is deemed to be the rewrite point. And after that, it is so managed that the frame data which arrow A points to be treated as invalid as the final frame of the group (N), and the frame data which arrow B points to be treated as valid as the final frame of the group (N).

And where an append is to be performed on recorded data illustrated in FIG. 19A above, the group (N+1) is recorded as shown in FIG. 19B in accordance with the appending rule earlier explained with reference to FIGS. 18A to 18C.

As a result, the vicinity of the linking position between the group (N) and the group (N+1) will take on such a frame pattern as illustrated in FIG. 19C.

In this case, the pattern obtained as LFN will be part of '23'→'0'→'0'→'0'→'23'→'0'→'0'→'0'→'1'. The normal append point at this time, as indicated by the arrow in the figure, is a position after the amble frame following the final frame (LFN=23) of the group (N), which is deemed to be valid.

In FIG. 19C, as the LFN, the pattern of '0'→'0'→'0' appears twice in succession, with '23' intervening. For instance, if the pattern of '23'→'0'→'0'→'0'→'1' involving the normal append point is detected when the frame pattern of FIG. 19C is scanned at the time of measurement, there will be no problem, but '23'→'0'→'0'→'0'→'23' involving intermediate frames (see FIG. 19A) may perhaps be detected as a frame pattern involving the append point owing to a failure to properly read the LFN of a certain frame for example.

Thus, if a rewrite takes place in a position close to the end of streaming, a pattern of consecutive intermediate amble frames and a pattern of consecutive amble frames recorded in accordance with the append point rule will be present mixed with each other as the LFN pattern, and accordingly it will be more likely for some other point than the normal append point to be misperceived as the append point.

For instance, if the '23'→'0'→'0'→'0'→'23' pattern part in FIG. 19C referred to above is misperceived as the append area, the position which arrow C points to will be detected as the append point. And in measuring the reference value for timing ATF servo for each streaming area, a reference value for each streaming recorded area will be measured with the aforementioned erroneously detected position which arrow C points to being assumed as the append point. In this case, when measuring the reference value for the streaming recorded area to which the group (N+1) belongs, the track formed of frames which should properly be contained in the streaming recorded area (group [N]) immediately before (the four frames from arrow C to before the normal append point) may also be scanned for the measurement purpose.

And when the track corresponding to these frames is actually used for measurement, should the positional shift of recording tracks on the magnetic tape be great in the streaming recorded areas before and after the normal append point shown in FIG. 19C, the reference value measured for the streaming recorded area to which the group (N+1) belongs would be highly likely to have a considerable difference from the properly required value and, therefore, if timing ATF servo control is executed on the basis of this reference value, the possibility of failure to execute proper tracking control will also become high.

Or, even if no misperception of the append area is committed, if the frame pattern of the appended area fails to be properly obtained, retrying of data reading will be repeated on the recording area in which the append point is expected to exist until adequate samples of LFN to identify the append point are obtained. While this retrying will eventually determine the normal append point, repetition of such an operation would take a correspondingly longer time to move on to reproduce after the measurement of the reference value.

The description with reference to FIGS. 19A to 19C, for instance, is no more than conceptual, and such a simple rewrite as what is illustrated in FIGS. 19A to 19C poses no practical problem in the detection of an append point. However, where retrying has been repeated many times before and after an append point, there will be present many intermediate frames before and after the amble frame containing the normal append point, and therefore greater accuracy will be required if the worst case is taken into consideration, so that dependence on frame pattern distinguishment by an LFN alone as described above would be insufficient in reliability.

Now, in this embodiment, by utilizing the information of ST-AFN earlier explained with reference to FIG. 13, perception of an append point during the scanning of the tape for measurement can be accomplished with greater accuracy without relying solely on the frame pattern distinguished by an LFN as referred to above. This operation to perceive an append point will be described afterwards.

3. Configuration of the Recording/Reproducing Apparatus

Here is described the configuration of a recording/reproducing apparatus as a form of this embodiment with reference to FIG. 1.

An interfacing section 1 is a part, connected to an external host computer not shown, for supplying and receiving data. During recording, it receives data from the host computer, and supplies them to an index adding circuit 2 and a subcode generating section 8. When reproducing, it performs an action to output data reproduced from a magnetic tape 90 to the host computer.

When recording, the index adding circuit 2 performs processing to add index information to inputted data on a group-by-group basis as stated above.

Data to which index information has been added are augmented by a C3 encoder 3, a C2 encoder 4 and a C1 encoder 5 with error correction codes of C3, C2 and C1 series, respectively. Each of the C3 encoder 3, C2 encoder 4 and C1 encoder 5 temporarily stores data into a memory and processes them on a group-by-group basis, each group constituting a unit of data. And the C3 encoder 3 generates an error correction code C3 for a data sequence corresponding to the direction of the track width, and adds it as the datum of the final ECC frame of one group of data. The C2 encoder 4 generates an error correction code C2 for a data sequence corresponding to the track direction, and makes it the error correction code C2 within fragments 0 to 8 and fragments 87 to 95 as shown in FIG. 10C. Furthermore, the C1 encoder 5 generates an error correction code C1 on a fragment-by-fragment basis.

The data to which the error correction codes C1, C2 and C3 have been added are supplied to a subcode adding circuit 7.

The subcode generating section 8 generates various subcode data and fragment addresses on the basis of the data supplied from the interfacing section 1, and supplies them to the subcode adding circuit 7. The subcodes which are generated include, for instance, separate counter information indicating boundaries of data, record counter information indicating the number of records, group count information indicating area IDs, frame numbers and the number of recorded units denoting the areas defined on the tape format, and checksums, and these are generated together with fragment addresses by the subcode generating section 8.

The subcode adding circuit 7 adds these subcodes and fragment addresses data unit by data unit, each data unit equivalent to a fragment. Thus information to be recorded in the address/subcode areas in FIGS. 10B and 10C is added.

Then in a header parity adding circuit 9, CRC codes to be recorded in the header parity areas in FIGS. 10B and 10C are added. These CRC codes are two-byte parity codes for detection of any error in subcodes and fragment addresses.

Then in an 8/10 modulation circuit is performed the so-called modulation processing, by which inputted data are converted from eight bits to 10 bits on a byte-by-byte basis, and sync signals are added by a sync signal adding circuit 11 to the resultant modulated signals. These sync signals are the one-byte sync signal at the leading edge of each fragment shown in FIG. 10B and 10C.

Further in a margin adding circuit 12, data corresponding to the margin areas at both ends of the track, as shown in FIG 10A, are added, and at this stage are generated recorded data sequences conforming to the track format of FIG. 9. The recorded data generated in this manner are supplied to a recording amplifier 13.

Signals amplified by the recording amplifier 13 are supplied via rotary transformers 14 to recording heads 15 in a rotary head drum HD, and the recording heads 15 perform a magnetic recording action on the running magnetic tape 90.

The magnetic tape 90 is housed in a tape cassette 91 and, when recording/reproducing is to be performed, the magnetic tape 90 is drawn out of the tape cassette 91 and wound around a (loading) rotary head drum 50. And the magnetic tape 90 is run at constant speed by constant speed revolution of a capstan 28, in a state of being pinched between the capstan 28 and a pinch roller 29.

Figure 2:
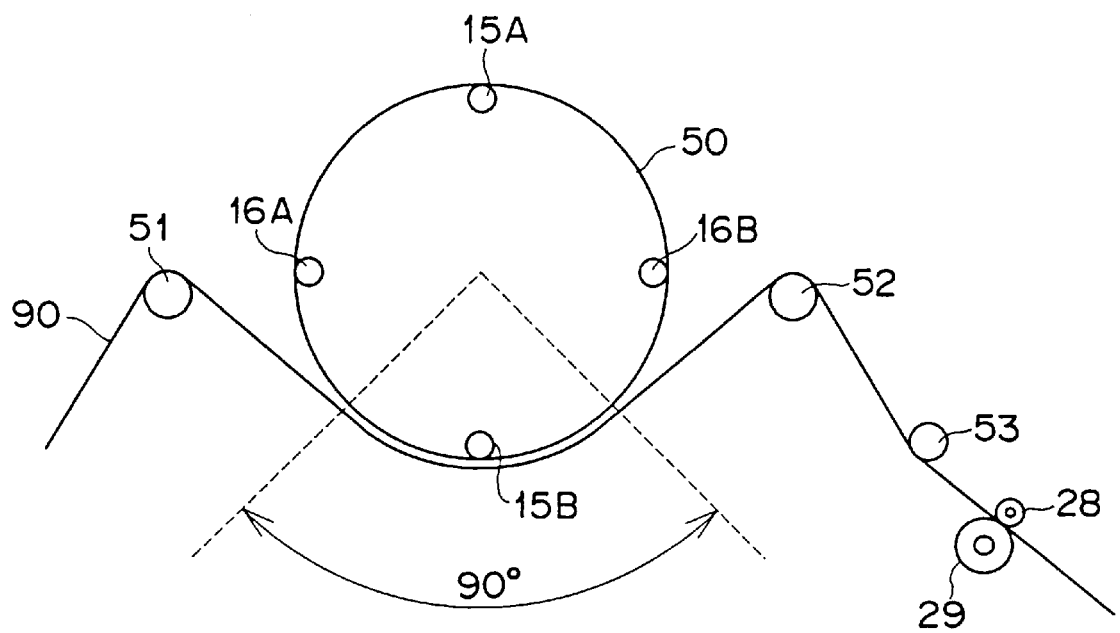
FIG. 2 is a diagram for describing the rotary head drum of the recording/reproducing apparatus embodying the invention.

FIG. 2 shows an image of action during recording and reproducing.

The magnetic tape 90 drawn out of the tape cassette 91, while being wound around by guide pins 51, 52 and 53 in a section of about 90° in a state of being inclined in the height direction against the rotary head drum 50, is run at constant speed by the capstan 28 and the pinch roller 29.

The rotation of the rotary head drum 50 being in sliding contact with this magnetic tape 90 causes recorded tracks by the helical scanning system illustrated in FIG. 9 to be formed on the magnetic tape 90 by the recording action by the recording head 15.

To add, although FIG. 1 shows only one recording head 15 and one reproducing head 16, in practice two recording heads 15A and 15B differing in azimuth angle and two reproducing heads 16A and 16B differing in azimuth angle are arranged on the circumference of the rotary drum in positions 180° apart from each other as illustrated n FIG. 2, because an azimuth beta recording system is adopted.

Figure 8:
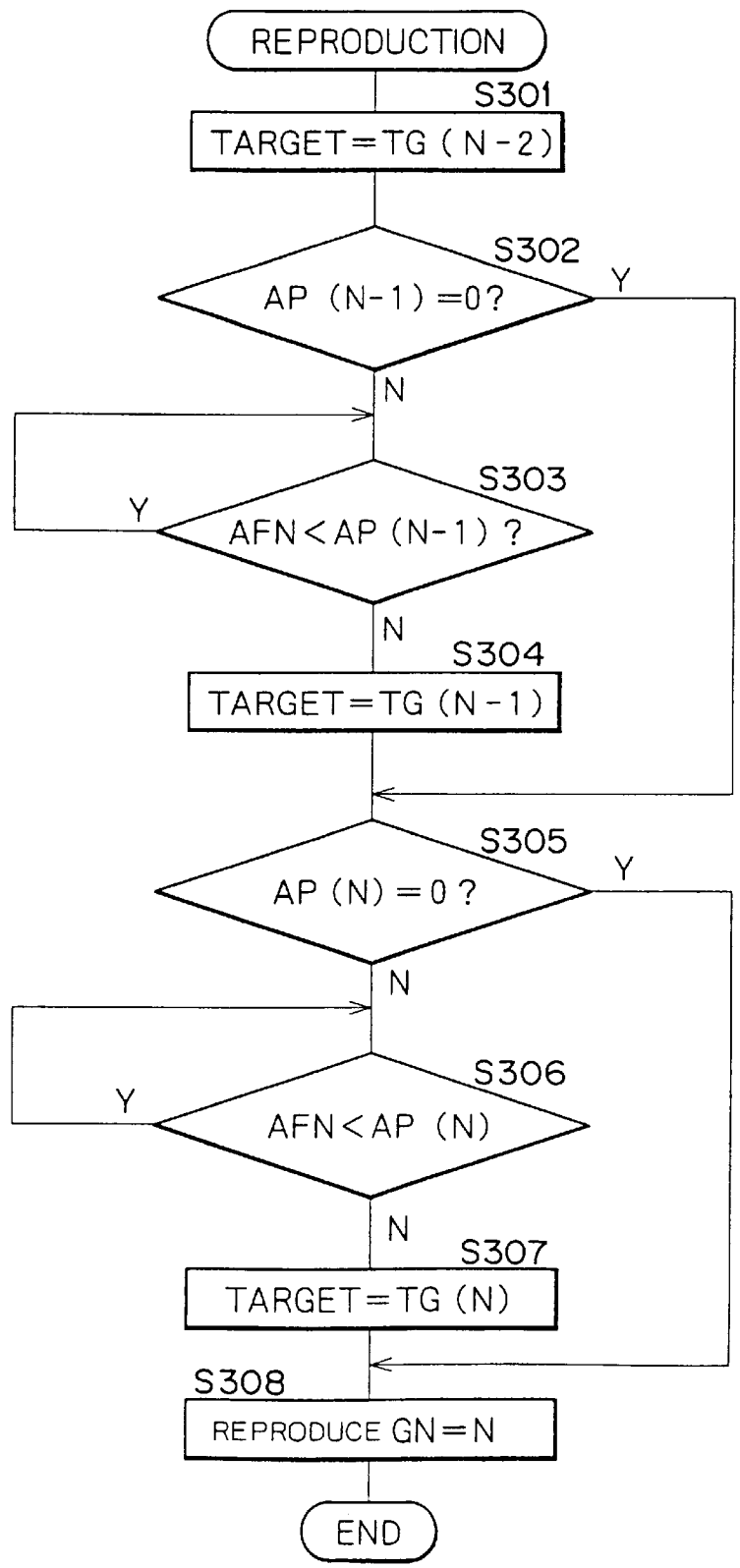
FIG. 8 is a flowchart showing the processing actions at the time of reproduction.

And in recording, as the recording head 15A and the recording head 15B alternately come into sliding contact with the magnetic tape 90, the track TKA and the track TKB differing in azimuth angle are alternately formed as shown in FIG. 8.

In reproduction, the rotation of the rotary head drum 50 with the running of the magnetic tape 90 wound around the rotary head drum 50 as illustrated in FIG. 2 causes the reproducing heads 16A and 16B to alternately trace the recorded tracks, and the recorded data are thereby read out.

And as shown in FIG. 1, signals readout by the reproducing heads 16 (16A and 16B) are supplied to a reproducing amplifier 18 via rotary transformers 17. To add, only one each of the rotary transformer 14 for recording use and the rotary transformer 17 for reproducing use is actually shown, the rotary transformers 14 are provided corresponding to the recording heads 15A and 15B in FIG. 2, and the rotary transformers 17 are also provided corresponding to the reproducing heads 16A and 16B.

Signals amplified by the reproducing amplifier 18 are supplied to a sync signal detecting circuit 19 to undergo processing for the detection of a sync signal. And a reproducing clock synchronized with the sync signal detected by an internal PLL circuit is generated, and the signals amplified by the reproducing amplifier 18 (RF signals) are binarized according to that reproducing clock.

The binarized data are subjected to decoding action by a 10-8 decoding section 20 for the 8-10 modulation at the time of recording, and thereby returned to eight-bit data.

The reproduced data demodulated into eight-bit data undergo a parity check on subcodes and fragment addresses by a header parity checking circuit 21 using the two-byte header parity shown in FIGS. 10B and 10C.

The data having gone through the parity check are supplied to a subcode separating circuit 22 and a timing detection pulse generating circuit 27.

The subcode separating circuit 22 extracts fragment addresses and subcode data, and supplies them to a system controller 31.

Other actual data than the fragment addresses and subcode data are delivered to a C1 decoder 23, a C2 decoder 24 and a C3 decoder 25.

The C1 decoder 23, the C2 decoder 24 and the C3 decoder 25 perform error correction processing of the C1, C2 and C3 series, respectively. Each of the C1 decoder 23, the C2 decoder 24 and the C3 decoder 25 temporarily stores the data on a group-by-group basis into a memory 6, and processes them. And the C1 decoder 23 processes correction on the basis of the error correction code C1 on a fragment-by-fragment basis, and the C2 decoder 24 processes correction using the error correction code for a data sequence corresponding to the track direction. Further, the C3 decoder 25 processes error correction using the error correction code C3 on a fragment-by-fragment basis.

The data having gone through error correction processing undergo separation of index information by an index separating circuit 26, and are delivered to the interfacing section 1. And they are outputted to an external host computer from the interfacing section 1.

The system controller 31 is composed of a microcomputer for controlling the whole apparatus. Thus it controls signal processing at the time of recording/reproducing, tape running and the rotation of the rotary head 50 among others.

A servo circuit 30, under instructions from the system controller 31, actually causes tape running and the rotation of the rotary head drum 50 to be executed. Incidentally, the servo circuit 30 can be composed of a microcomputer, or may as well be integrated with the system controller 31 as a circuit system relying on the microcomputer functions as the system controller 31.

The rotation of the rotary head drum 50 is executed by a drum motor 33.

And the rotary head drum 50 is fitted with a drum P (pulse generator) 36 and a drum FG (frequency generator) 37, and a pulse from this drum PG 36 is supplied to the servo circuit 30 via an amplifier 38. A pulse from the drum FG 37 is also supplied to the servo circuit via an amplifier 39.

The servo circuit 30 generates a switching pulse in response to the pulses from the drum PG 36 and the drum FG 37, and can also detect rotational phase information.

The switching pulse is a signal which serves as the reference for the switching of processing corresponding to the so-called A azimuth head and B azimuth head.

For control regarding constant speed rotation driving of the rotary head drum 50, the servo circuit 30 detects the number of revolutions from the pulse from either the drum PG 36 or the drum FG 37, and obtains rotational error information by comparing this with the reference number of revolutions. And it causes the rotary head drum 50 to rotate at constant speed by adjusting a drive signal to be fed from a drum motor driver 32 to the drum motor 33 according to the rotational error information.

Furthermore, by controlling the number of revolutions of the capstan 28, the so-called tracking servo is accomplished. In this example, the timing ATF system described with reference to FIG. 11 is adopted as the tracking servo system.

The capstan 28 is rotationally driven by a capstan motor 35. The capstan 28 is also fitted with a capstan FG (frequency generator) 40, and a pulse from this capstan FG 40 is supplied to the servo control circuit 30 via an amplifier 41.

In order to cause the capstan 28 to rotate at constant speed, the servo circuit 30 detects the number of revolutions of the capstan according to the pulse from the capstan FG 40, and obtains rotational error information by comparing it with the reference number of revolutions. And it causes constant speed rotation to take place by adjusting, in accordance with the rotational error information, a drive signal to be fed from a capstan motor driver 34 to the capstan motor 35.

And, in order to execute tracking servo, the servo circuit 30 monitors the reference phase position timing of the rotary head drum 50 detectable according to the switching pulse and a timing detection pulse TTP supplied from the timing detection pulse generating circuit 27, and measures that period as the tracking detection period. And by comparing the measured value of the tracking detection period with a preset reference value, it obtains tracking error information, adjusts the drive signal to be fed from the capstan motor driver 34 to the capstan motor 35 on that basis, and performs tracking servo by raising or reducing the rotational speed of the capstan 28.

4. Configuration for Timing ATF (4-1. Circuit configuration for timing ATF control)

Figure 3:
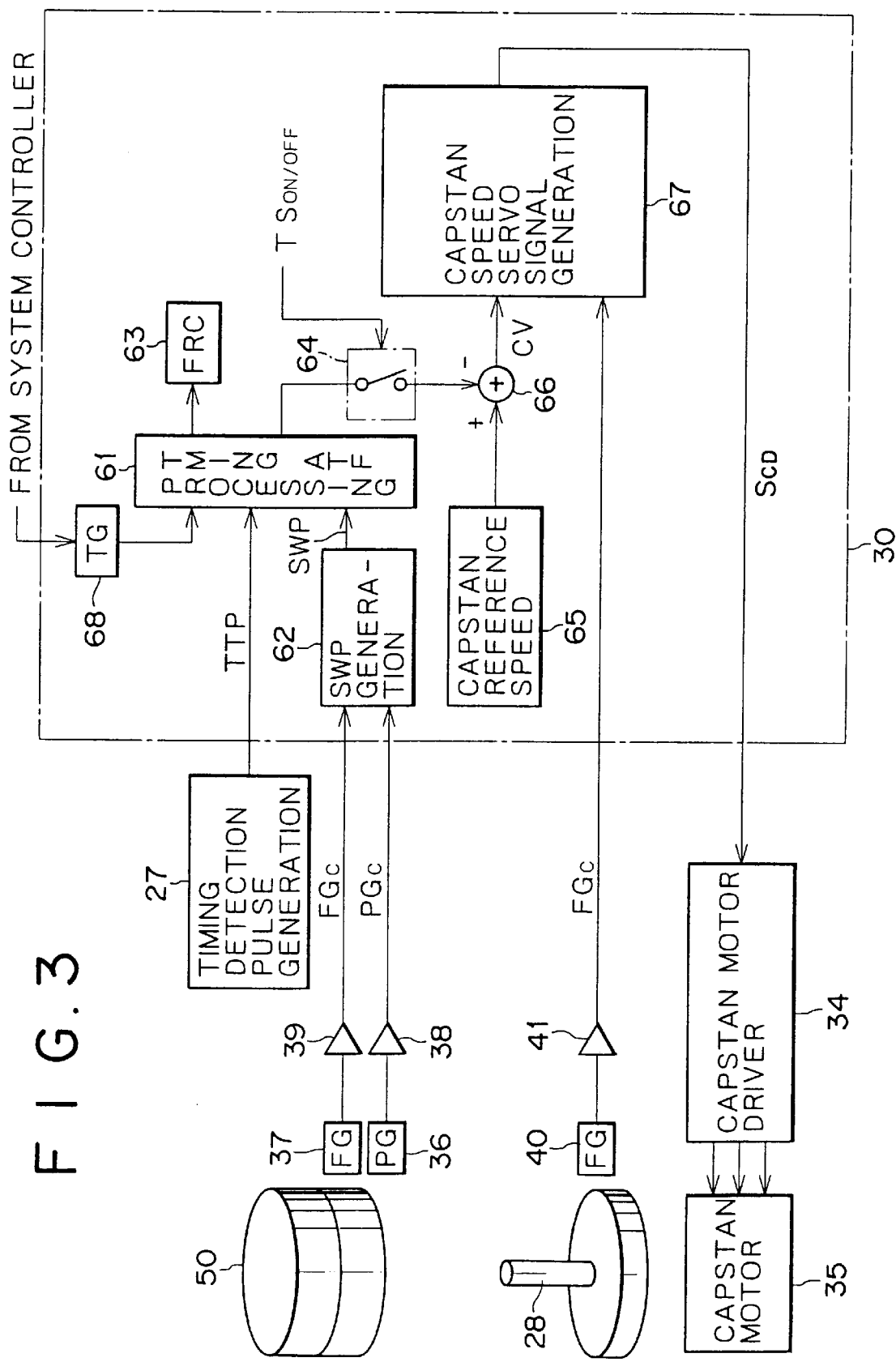
FIG. 3 is a block diagram of the capstan servo system of the recording/reproducing apparatus embodying the invention.

The configuration of the circuit system for timing ATF operation is illustrated in FIG. 3.

The circuit system for capstan servo, including timing ATF operation, is provided, within the servo circuit 30, with a timing ATF processing section 61, a reference value register 68, a switching pulse generating section 62, a free running counter 63, a servo switch 64, a capstan reference speed generating section 65, a subtractor 66 and a speed servo signal generating section 67.

When the capstan 28 is to be driven for constant speed rotation with tracking servo off, the servo switch 64 is turned off by a servo on/off control signal TS ON/OFF supplied from the system controller 31.

In this case, a signal corresponding to the speed desired to be set as the rotational speed of the capstan 28 is generated by the capstan reference speed generating section 65, made a target speed signal CV as it is, and supplied to the speed servo control signal generating section 67. To the speed servo control signal generating section 67 is supplied the pulse FGC from the capstan FG 40, i.e. a pulse to take on a frequency corresponding to the rotational speed of the capstan 28, and the speed servo signal generating section 67 detects the current rotational speed of the capstan 28 from this pulse FGC.

And the speed servo signal generating section 67 compares the current rotational speed detectable from the pulse FGC and the target speed signal CV indicating the rotational speed to be targeted for, and supplies the difference between them to the capstan motor driver 34 as a capstan servo signal SCP.

Whereas the capstan motor driver 34 drives the capstan motor 35 with, for instance, a three-phase drive signal to rotate the capstan 28, constant speed rotation servo is executed so that the capstan 28 converge on the target speed signal CV generated by the capstan reference speed generating section 65 by controlling the motor drive voltage according to the capstan servo signal SCP.

Therefore, if the target speed signal CV generated by the capstan reference speed generating circuit 65 is the tape running speed for usual recording/reproducing (single speed), the capstan 28 will be rotated at the constant single speed, or if the target speed signal CV is selected for a double speed, the capstan 28 will be rotated at the constant double speed. Thus, by varying the target speed signal CV generated by the capstan reference speed generating section 65, the tape running speed can be varied. The target speed signal CV generated by the capstan reference speed generating section 65 can be controlled by the system controller 31 according to the operating state at the time. For instance, the speed can be varied between single for reproduction and x times the single for fast forward reproduction.

When tracking control is to be performed during reproduction, the servo switch 64 is turned on. And the target speed signal CV is generated by having the timing ATF processing section 61 detect a tracking error and the subtractor 66 subtract this error from the value generated by the capstan reference speed generating section 65. Thus, in this case, the target speed signal CV is raised or reduced around a prescribed speed (e.g. the single speed) according to the tracking error. Therefore the tape running speed is accelerated/decelerated around the prescribed speed according to the state of tracking, and thereby converged onto the just tracking state. As the tracking error is substantially zero when tracking is stable, the tape running will continue substantially at the prescribed speed.

Processing to detect any tracking error by the timing ATF processing section 61 is carried out on the basis of a timing detection pulse TTP from the timing detection pulse generating circuit 27, a switching pulse SWP generated by the switching pulse generating section 62, and the reference values held by the reference value register 68.

Figure 20:
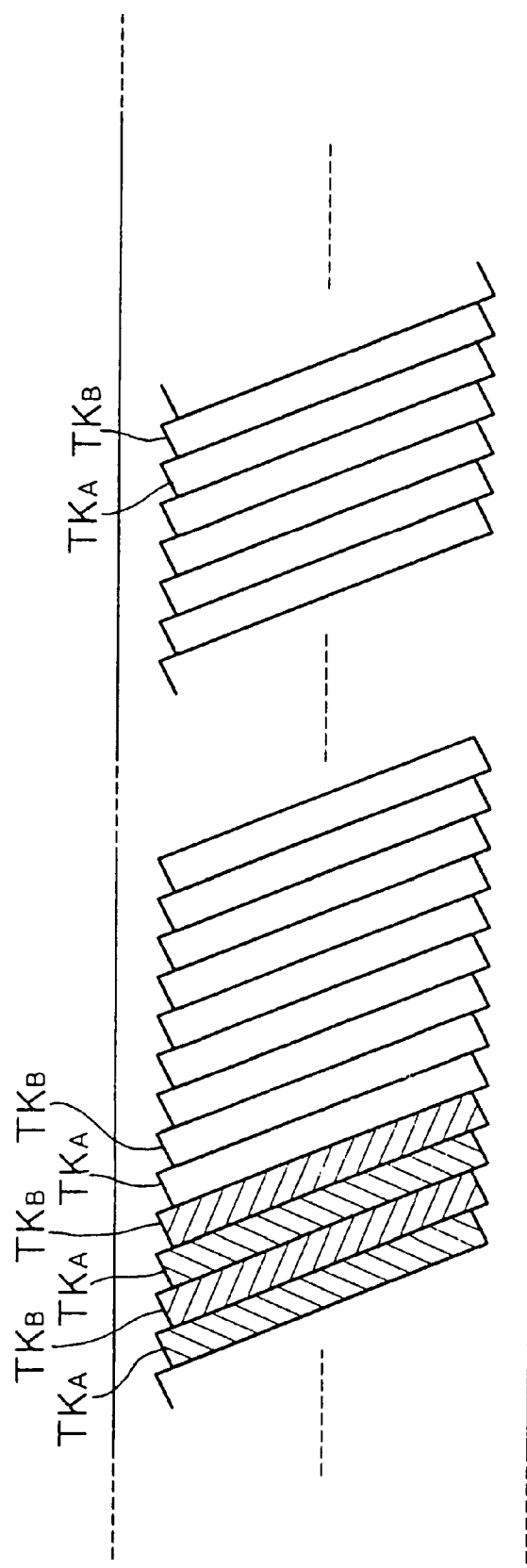
FIG. 20 is a diagram for describing tracks under a helical scanning system.

Here, the reference values held by the reference value register 68 for timing ATF servo are supposed to be reference values measured for each streaming recorded area by a reference value measurement for this embodiment, to be described afterwards, held matched with that streaming recorded area. As reference values each corresponding to a streaming recorded area, there are supposed to be two reference values for tracks TKA and TKB of mutually inverse azimuths (see FIG. 20) constituting one frame.

The reference values for the reference value register 68 are set by matching the values, computed by the system controller 31 by reference value measurement, with each streaming recorded area. In performing tracking control during reproduction, the system controller 31 identifies the streaming recorded area which is supposed to be currently reproduced, and alters the reference values to be outputted from the reference value register 68 matched with this identified streaming recorded area.

The timing detection pulse generating circuit 27 generates a timing detection pulse TTP from the data having undergone a header parity check from the header parity checking circuit 21 as shown in FIG. 1. The timing detection pulse TTP is a signal for measuring the tracking phase state, and it is the pulse detected from a specific position on a track denoted as a position PTTP in FIG. 21.

The timing detection pulse generating circuit 27 generates a timing detection pulse TTP on the basis of data detected from the sync signal area, the address/subcode area and the header parity area out of the data read out of tracks, i.e. the header data of fragments.

For instance, if a fragment as a specific position on a track (the position PTTP in FIG. 21) is detected according to a fragment address, a timing detection pulse TTP is outputted in response to that header data detection.

Figures 4A, 4B, 4C, 4D, 4E:
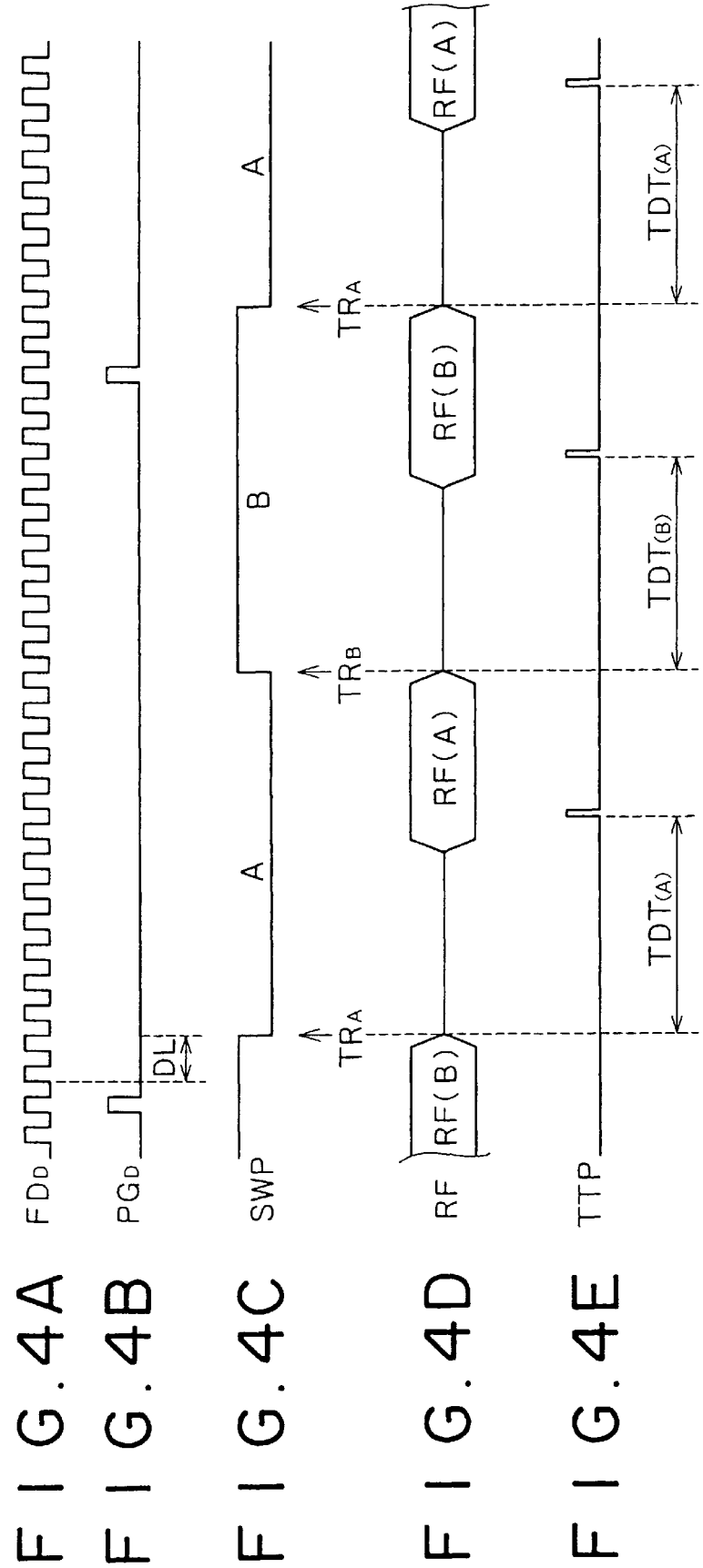
FIGS. 4A to 4E are diagrams for describing the operation of the capstan servo system of the recording/reproducing apparatus embodying the invention.

FIG. 4D shows an image of RF signals read out of the tracks TKA and TKB, and FIG. 4E illustrates the timing detection pulse TTP generated by the timing detection pulse generating circuit 27.

As is seen from these diagrams, the timing detection pulse TTP is outputted at a timing corresponding to the reproduction scanning of a specific position PTTP on each track in the reproduction scanning period of the track.

On the other hand, FIG. 4A shows an example of pulse FGD generated by the drum FG37, and FIG. 4B, an example of pulse PGD generated by the drum FG36.

Both the pulse FGD and the pulse PGD are pulses of a frequency matching the rotational speed of the rotary head drum 50, and the pulse PGD is generated corresponding to a specific phase position in the rotation of the rotary head drum 50.

The switching pulse generating section 62 generates the switching pulse SWP of FIG. 4C by using the pulse FGD and the pulse PGD.

For instance with reference to the rise of the pulse FGD at the timing next to the detection of the pulse PGD, the switching pulse SWP is so generated that a timing behind that by a prescribed delay time DL become the fall of the switching pulse SWP. The switching pulse SWP becomes a signal which serves as the reference for switching between the A channel (the reproducing head 16A) and the B channel (the reproducing head 16B) regarding signal processing, and this switching pulse SWP, though not shown in FIG. 3, is supplied to various other necessary circuit systems as well.

The period during which the switching pulse SWP is at the "L" level is the processing period regarding reproduced data from the reproducing head 16A; in this period the track TKA is scanned by the reproducing head 16A, and data reading (RF(A)) from the track TKA takes place as shown in FIG. 4D. On the other hand, the period during which the switching pulse SWP is at the "H" level is the processing period regarding reproduced data from the reproducing head 16B; in this period the track TKB is scanned by the reproducing head 16B, and data reading (RF(B)) from the track TKB takes place as shown in FIG. 4D.

The timing ATF processing section 61 uses the fall timing of the switching pulse SWP as the reference phase position of the rotary drum, which serves as the reference for timing ATF action concerning the track TKA. Thus it is made the timing TRA in FIG. 21.

And it measures a period TDT (A) from the timing TRA until the inputting of the timing detection pulse TTP. Thus it measures the length of time from the reference phase position of the rotary drum until the detection of a prescribed signal (the timing detection pulse TTP) by the head from the track.

The free running counter 63 is used in this measurement. For instance, the count of the free running counter 63 is latched at the fall timing TRA of the switching pulse SWP, and the count of the free running counter 63 is latched at the input timing of the timing detection pulse TTP. And subtraction processing with these two counts gives the measured value of the tracking detection period.

And the measured value obtained in this manner is compared with the reference value currently outputted from the reference value register 68, i.e. the reference value for the track TKA in the streaming recorded area supposed to be currently reproduced, and the difference is used as servo error information concerning the track TKA.

Regarding the track TKB, the rise timing of the switching pulse SWP is used as the timing TRB of the reference phase position of the rotary drum, which is the reference for the timing ATF action.

And the period TDT(B) from the timing TRB until the inputting of the timing detection pulse TTP is similarly measured by using the free running counter 63.

And the measured value obtained in this manner is compared with the reference value for the track TKB in the streaming recorded area which is supposed to be currently reproduced, being outputted from the reference value register 68, and the difference is used as servo error information concerning the track TKB.

As already described with reference to FIG. 21, controlling the rotating speed of the capstan 28 by inputting the servo error information thereby obtained to the subtractor 66 and causing the target speed signal CV to reflect it, the drum rotating speed and the tape running speed are regulated relative to each other so as to achieve a satisfactory tracking state.

(4-2. Setting of tape running speed for reference value measurement)

Incidentally, in order to execute the above-described timing ATF servo action satisfactorily, the magnetic tape is required to be run so that each of the plurality of tracks in a given tape running section be scanned in as uniform a phase position as possible. Thus, if samples of measured values for tracking detection periods thereby obtained are collected and their average is figured out, a reference value involving only an extremely few errors can be obtained.

Then, in this embodiment, the tape running speed is prescribed on the ground to be explained below with reference to FIG. 14 to FIG. 17 so that reference value setting for measurements including repositioning, for instance, in tape scanning be accomplished free of errors.

Here, the tape running speed during ordinary reproduction being supposed to be the single speed, this single speed is a speed at which the tracking phase states for the scanned tracks become the same phase states.

Obviously, during ordinary reproduction, even if tracking servo is turned off, it is desirable that a reasonably proper tracking state be maintained for each track, and for this reason the single speed is set to such a speed that the same tracking phase state can be achieved for each track.

Figure 14:
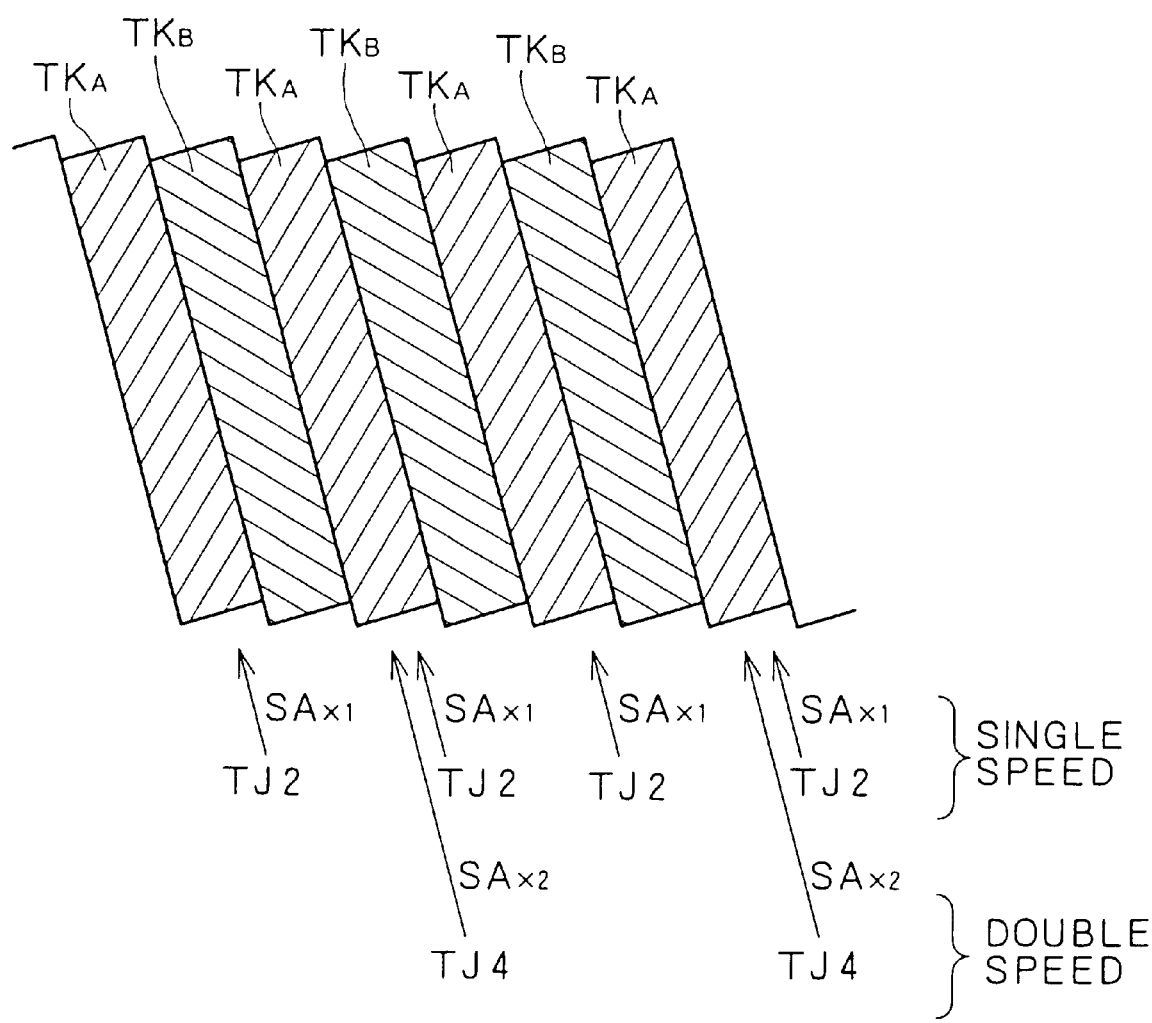
FIG. 14 is a diagram for describing the tracking phase angles in scanning while running at the single speed and the double speed.

Therefore, if for instance the tape is run at the single speed and tracking servo is off as shown in FIG. 14, during the scanning of each track TKA by the A azimuth head (SA×1), each will be in substantially the same tracking phase state indicated as TJ2 for instance.

If this is applied to tape rewinding at the double speed at the time of repositioning, the scanning of each track TKA by the A azimuth head during tape rewinding (SA×2) will be in a substantially the same tracking phase state for each round of scanning. For this case, FIG. 14 illustrates an example in which the tracking phase state is in a state denoted by TJ4 in each round of scanning.

Thus, if the tape is rewound at a speed equal to an integral multiple of the speed for ordinary reproduction as the running speed of the magnetic tape during measurement of a reference value, the tracking phase states for different rounds of scanning become substantially similar, and this makes it impossible to obtain samples of tracking detection periods in different tracking phase states. This means impossibility to figure out an accurate reference value even if the samples of tracking detection periods are averaged, and eventually no proper tracking control can be expected because the target speed signal CV would involve a significant error.

Then, concerning the setting of a suitable tape running speed to enable the setting of a reference value to be efficiently accomplished, a case in which the tape is rewound at ⅔ of the ordinary speed will be described on a tentative basis. However, ⅔ of the ordinary speed is not necessarily a suitable tape running speed for this example.

Figure 15:
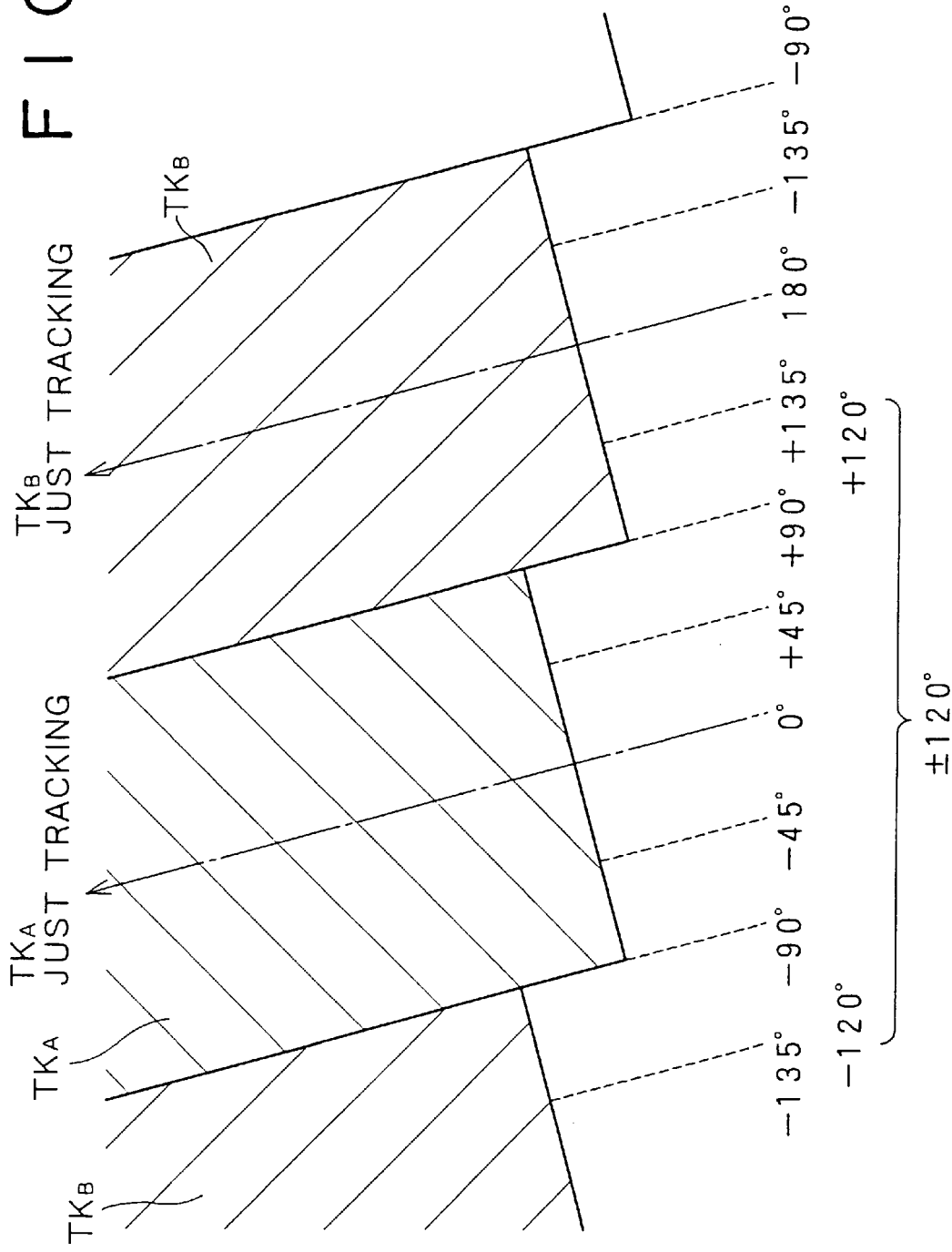
FIG. 15 is a diagram for describing the tracking phase angles vis-a-vis tracks.

Now, the tracking phases for the tracks TKA and TKB are illustrated as in FIG. 15.

Thus, as viewed from the reproducing head 16A of A azimuth, the tracking phase position in which a just tracking state is achieved for the track TKA of A azimuth is supposed to be 0°, and the range extending to the tracking phase position in which a just tracking state is achieved for the next track TKA of A azimuth with the adjacent B azimuthal track TKB in-between is supposed to be a 360° range. Therefore, the phases at the edges of the track TKA are supposed to be +90° and −90°, and the just tracking position for the track TKB is supposed to be a 180° phase as viewed from the reproducing head 16A of A azimuth.

And it is supposed that, when the tape is run at the single speed, the scanning phase position of the reproducing head 16A varies by 360°. If, for instance, a given track TKA is scanned in a just tracking state, the next scanning will take place on the next track TKA of A azimuth with the adjacent track TKB of B azimuth in-between in a just tracking state. The same is true with the reproducing head 16B.

Furthermore, although the range in which the reproducing heads 16A and 16B can read data changes with various conditions, the range is tentatively supposed here to be ±120° from the just tracking phase position of the track of the corresponding azimuth. Thus, to take up the reproducing head 16A as an example, when the tracking phase is within the range of −120° to +120° as shown at the bottom of FIG. 15, data can be read from the track TKA of A azimuth.

Figure 17:
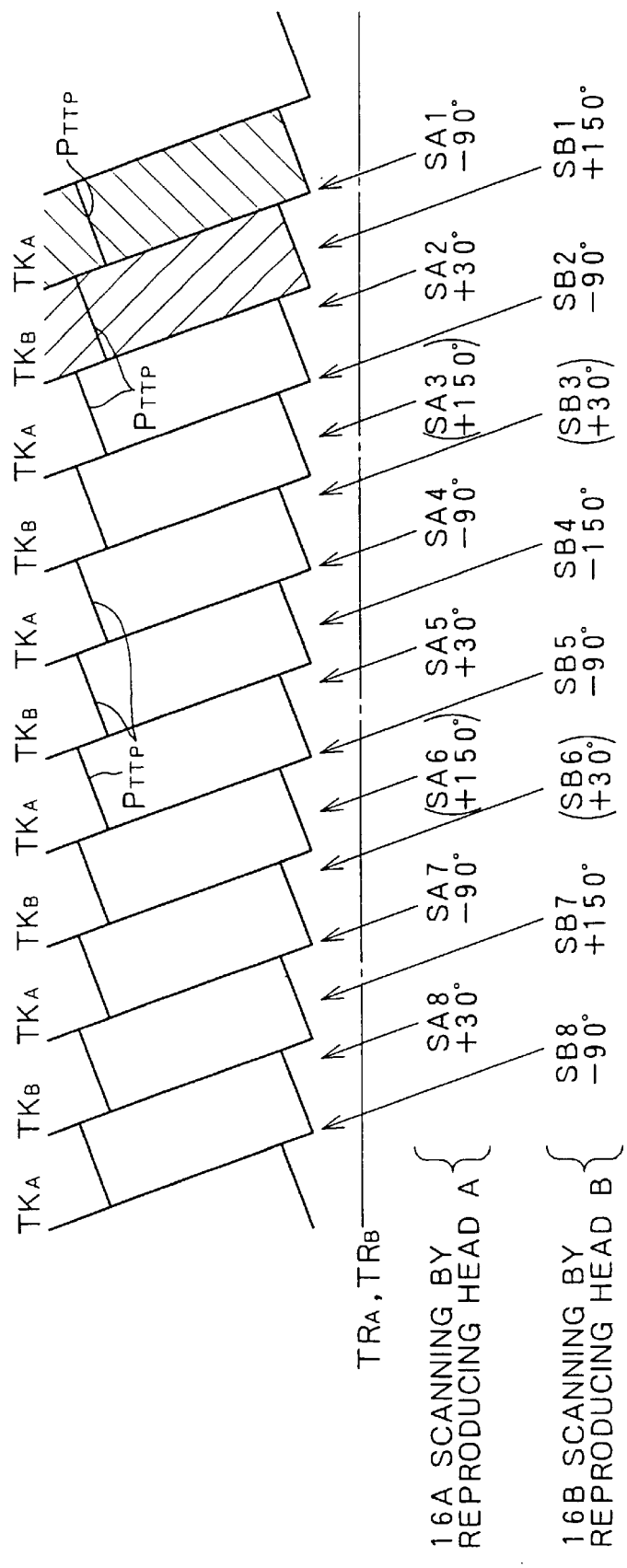
FIG. 17 is a diagram for describing the tracking phase angles in scanning while running at the 2/3 speed.

FIG. 17 illustrates a case in which the tape is run at ⅔ of the single speed.

In the figure, the arrows below the tracks TKA and TKB indicate the tracking phase positions of scanning done by the reproducing heads 16A and 16B during running.

When setting a reference value during the rewinding of the tape for repositioning or the like, in order to obtain samples during that tracking detection period, it is supposed, for instance, that the reproducing heads 16A and 16B accomplish 30 rounds each of scanning.

First the reproducing head 16A is looked at. It is supposed that the first scanning round SA1 from the start of running takes place on an edge part of the track TKA, i.e. in a state where the tracking phase is −90°. Since the tracking phase varies by 360° in a round of scanning by the reproducing head 16A during running at the single speed, the tracking phase varies by 240° in each round of scanning by the reproducing head 16A during running at the ⅔ speed.

Therefore, along with the progress of scanning as indicated by SA2, SA3, SA4 . . . , the tracking phase of scanning varies from +30°, +150°, −90°, +30°, +150 . . . .

To look at the reproducing head 16B similarly, along with the progress of scanning as indicated by SB1, SB2, SB3, SB4 . . . , the tracking phase of scanning varies from +150°, −90°, +30°, +150°, +90°. . . .

Whereas samples of tracking detection periods are obtained in these rounds of scanning in order to set a reference value, samples of tracking detection periods cannot be obtained unless scanning takes place within a range of ±120° from the just tracking phase position of the track of the corresponding azimuth with respect to each reproducing head, because no timing detection pulse TTP is generated unless head data in a prescribed position on the track are obtained.

Therefore, the reproducing head 16A cannot obtain samples in the parenthesized scanning rounds SA3 and SA6 where the tracking phase is +150°. Similarly the reproducing head 16B cannot obtain samples in the parenthesized scanning rounds SB3 and SB6 where the tracking phase is +30°.

And moreover, since both reproducing heads 16A and 16B return to their respective initial tracking phase positions after three rounds of scanning, even if 30 rounds of scanning are performed, the only samples obtained are the samples at −90° and +30° for the reproducing head 16A, or the samples at −90° and +150° for the reproducing head 16B.

Thus both reproducing heads 16A and 16B can obtain samples of tracking detection periods in only two tracking phase positions. If the average is calculated from such samples and a reference value is set on that basis, the resultant reference value will involve a significant error.

To consider the reproducing head 16A for example, the value for the tracking detection period at −30° would be set as the reference value, derived from the average of samples at −90° and +30°.

And performing tracking servo on this basis would result in the application of servo always toward the tracking detection period at −30°, and this would be extremely inappropriate.

Then, in this embodiment, the tape running speed for reference value setting is tentatively set as follows.

First is considered a case in which a speed slightly deviating from the aforementioned ⅔ speed is selected. In this case, the tracking phase angle, varying from round to round of scanning, for each reproducing head will be an angular value slightly different from the 240° at the time of the ⅔ speed, and the tracking phase angle in each round of scanning will be an angle slightly deviating from that at the ⅔ speed shown in FIG. 7, with the degree of deviation increasing with the progress of scanning. And when the degree of deviation reaches 120°, the initial phase is resumed.

In order to obtain samples unbiased in tracking phase angle in 30 rounds of scanning, it is considered preferable that the phase make about three rounds in the 30 rounds of scanning for instance. Thus, supposing a 120° phase variation in 10 rounds of scanning, the corresponding speed is 1/30 of the single speed, and accordingly a speed deviating from the ⅔ speed by 1/30 of the single speed would make possible collection of unbiased samples.

Figure 16:
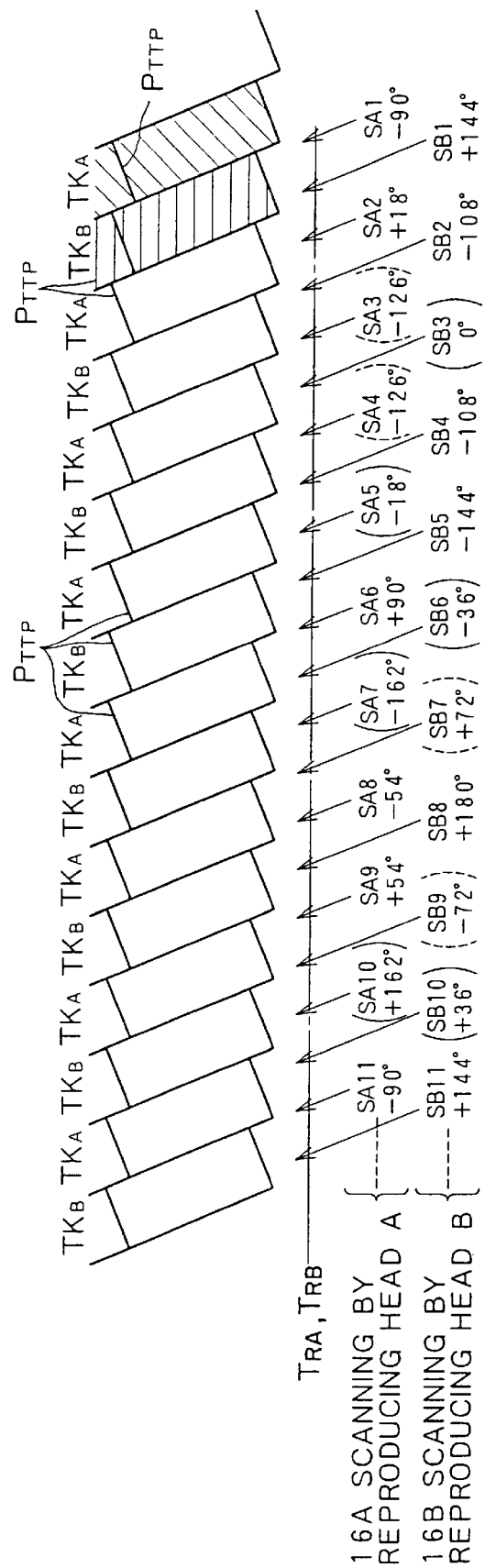
FIG. 16 is a diagram for describing the tracking phase angles in scanning while running at the 7/10 speed.

FIG. 16 illustrates in the same manner as FIG. 17 the tracking phases of scanning at a tape running speed is advanced by 1/30 from the ⅔ speed. Thus, this is a case in which the tape is run at 21/30 (=7/10) of the single speed.

First it is supposed that, like in FIG. 17, the first scanning round SA1 takes place in a state where the tracking phase is −90°. In this case, the tracking phase varies by 252° in every round of scanning by the reproducing head 16A.

Therefore, as indicated in the diagram by the scanning rounds SA1, SA2, SA3, SA4 . . . SA10, the tracking phase in the 10 rounds of scanning varies from −90° to +18°, +126°, −126°, −18°, +90°, −162°, −54°, +54° and +162°, and returns to the initial phase −90° in the 11th scanning round SA11.

Similarly for the reproducing head 16B, the tracking phase in the 10 rounds of scanning SB1 to SA10 varies from +144° to −108°, 0°, +108°, −144°, −37°, +72°, 180°, −72° and +36° , and returns to the initial phase +144° in the 11th scanning round SB11.

The rounds of scanning parenthesized in the diagram are the rounds of scanning in which no sample of the tracking detection period can be obtained on account of an azimuth track relationship as in FIG. 17. However, the rounds of scanning marked with broken line parentheses are the rounds of scanning in phases only slightly deviating from the range of ±120° from the just tracking phase position of the track of the corresponding azimuth with respect to each reproducing head, and they may permit data reading depending on various conditions.

Therefore, with the reproducing head 16A, no sample can ever be obtained in the scanning rounds SA7 and SA10, and samples may be unavailable in the scanning rounds SA3 and SA4.

With the reproducing head 16B, no sample can ever be obtained in the scanning rounds SB3, SB6 and SB10, and samples may be unavailable in the scanning rounds SB7 and SB9.

However, in this case, samples of the tracking detection period can be obtained for at least six different tracking phase angles in the scanning rounds SA1, SA2, SA5, SA6, SA8 and SA9 with the reproducing head 16A and, with the reproducing head 16B, samples of the tracking detection period can be obtained for at least five different tracking phase angles in the scanning rounds SB1, SB2, SB4, SB5 and SB8.

Whereas the number of different tracking phase angles at which samples can be obtained varies with the tracking phase position of the first round of scanning, the accuracy of the tape running speed, and the accuracy of the width of the track on which recording is being made among other factors, it can be assumed that at least five different samples distributed substantially uniformly, sometimes even more diverse samples, can be obtained with each reproducing head.

And if the average is calculated from these samples available in such a uniform distribution and setting a reference value on that basis, that reference value can be made a value with virtually no difference from the just tracking phase, resulting in the realization of proper tracking servo.

Whereas setting the tape running speed at, for instance, 7/10 of the single speed as referred to above would be suitable for the setting of the reference value, next will be considered what other speeds than the 7/10 speed are suitable.

The tape running speed to be set is supposed to be n/m of the single speed, where n is an integer.

And a case of m=9 will be considered. If the tape is run at any of n/9 speeds, excluding cases wherein the fractional number can be reduced, the tracking phase state will complete a full round in nine rounds of scanning. Thus a sample can be obtained at every multiple of 40° of the tracking phase. Of course, such tracking phases include those where no sample can be obtained in a position corresponding to a track of an inverse azimuth. Or in a tracking phase state in the vicinity of +120° or in the vicinity of −120° from the just tracking phase position of the track of the corresponding azimuth, the possibility of data detection, i.e. the possibility of measuring the tracking detection period, is a matter of probability.

Considering these points, the average of the samples of the tracking detection period obtained from tracking phases at 40° intervals would give, in terms of tracking phase, values with a maximum deviation of about 10° from the just tracking phase.

However, this 10° difference corresponds to an error by 1/18 of the track width, and this is within a permissible range with respect to tracking accuracy.

Thus, at an n/m speed, if it is a speed whose m value is no less than 9 (except cases where the fraction can be reduced), the setting of the reference value will be possible with substantial accuracy, and in this case tracking servo can be satisfactorily realized.

However, the denominator of the n/m speed, i.e. "m," means that the tracking phase position completes a full round in m rounds of scanning. Thus the first scan and the m+1-th scan will have the same tracking phase position.

In order to obtain samples in as uniform a distribution as possible, it is desirable to have the greatest number of scanning rounds per full turn of the phase, and for this reason the value of m is required to be not less than 9, but on the other hand, if the value of m is too great, a large number of scanning rounds will be required to obtain samples in a uniform distribution, i.e. it will take a long time to obtain samples in a uniform distribution.

Therefore, the suitable upper limit for the value of m is the number of scanning rounds Z that can be executed by the head in a length of time allocated for reference value measurement. In other words, when a length of time for reference value measurement has been allocated, the tape running speed (i.e. the n/m speed] during reference value measurement may be set by setting the value of m within the upper limit of the number of scanning rounds Z than can be executed by the head within that length of time (m≦Z).

Incidentally, whereas tracking servo can be satisfactorily realized by setting a specific speed value as the n/m speed, if any error in the mechanical precision in the tape running system, any elongation of the tape, the running speed of the tape and various other destabilizing factors are taken into consideration, and accurate tracking is to be realized even in a state where these conditions are relatively unfavorable, the suitable range of the tape running speed should be more stringently defined.

Then the consideration of the conditions for the running speed to obtain samples in a uniform distribution is made more specifically for each multiple speed, and the range of tolerance is made somewhat more stringent, a more suitable tape running speed is to be found in the following ranges when the setting of the reference value is considered in the speed multiplier range of 0 to 1.

| | |
|---|---|
| 0.1 | to 0.1125 |
| 0.22 | to 0.225 |
| 0.442857 | to 0.45 |
| 0.55 | to 0.557143 |
| 0.775 | to 0.78 |
| 0.8875 | to 0.9 |

And these ranges of the speed value consist of multiple speed values not fitting into the range of multiple speed values of $(n/M)\pm(1/(M\cdot X))$.

To add, X=10 is supposed, i.e. it is presupposed that the tracking phase position completes a full round in 10 rounds of scanning (the tracking position is the same in the first round of scanning and in the 11th round of scanning) . And n is an integer, and M is a natural number from 1 to 8. Further, n<m is supposed.

And under these conditions, the range of multiple speed values of $(n/M)\pm(1/(M\cdot X))$ is excluded, and examples of what seem appropriate for practical purposes among the rest are the speed ranges stated above.

To add, therefore, if what does not fit into the range of multiple speed values of $(n/M)\pm(1/(M\cdot X))$ is the only condition to be met, appropriate speed values exist besides the examples of the above-stated speed ranges. Furthermore, only the speed multiplier range of 0 to 1 was shown above, but a multiple speed with an integer added to any of these values (e.g. a 1.1 multiple speed) is within the tolerance of the reference value that is set.

As stated above, the tape running speed to be chosen when setting the reference value for tracking servo action may be an n/m multiple speed as a value to satisfy the condition of $9\leq m \leq Z$, and more preferably within the range of the speed multiplier range cited above.

(4-3. Outline of reference value measurement)

In this embodiment, whereas an AFN, which is a serial frame number, is recorded corresponding to the pack item area number 4, and an ST-AFN selected out of the aforementioned AFNs is recorded corresponding to the pack item area 7 as described with reference to FIG. 13, these AFN and ST-AFN are utilized to detect an append point in scanning for reference value measurement. For instance, during the period of scanning the magnetic tape, by identifying an ST-AFN read out of the scanned track and comparing its identity with an AFN read out of the track together with the ST-AFN, the starting frame of streaming, i.e. an append point, can be detected. Here, even if, for instance, there temporarily arises a situation in which accurate reading of the ST-AFN and the AFT becomes temporarily impossible, the scanned track (frame) can be identified by having the system controller process interpolation because AFNs have continuity with adjoining frames.

If an append point is detected in this manner, a more accurate detection result can be obtained than by the method whereby, for example, an append point is detected from the frame pattern before and after an append point identified by an LFN indicating a frame within a group.

In order to detect an append point in this manner, required identifying information including the AT-AFN as the pack item number 7 should be recorded, at the time of recording, with respect to a prescribed fragment for each track. Therefore, in this embodiment, identifying information required for the detection of an append point for this embodiment is recorded by recording data in the manner described below.

(4-4. Processing for recording)

Figure 5:
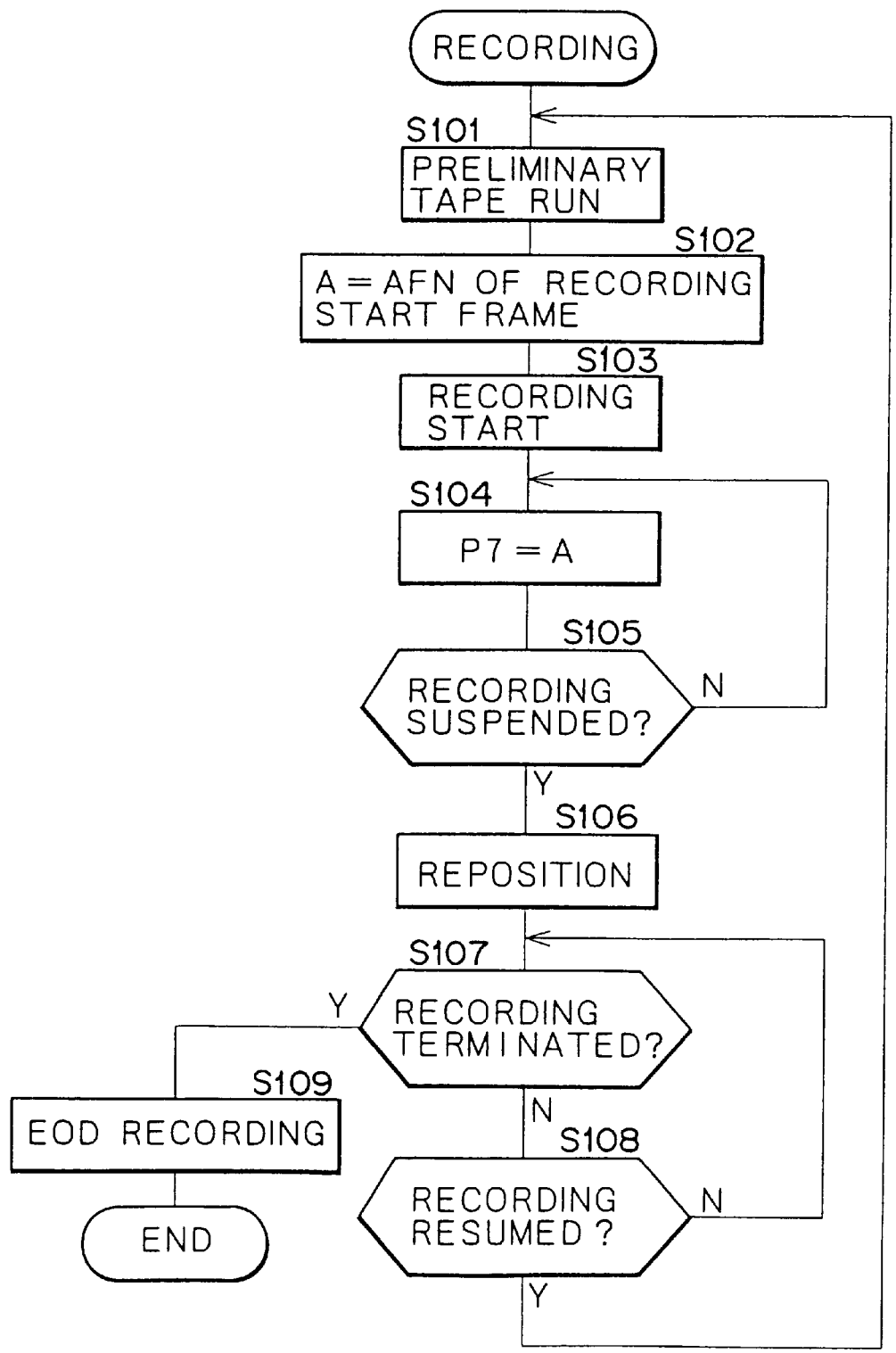
FIG. 5 is a flowchart showing the processing actions at the time of recording.

FIG. 5 is a flowchart showing the processing by the system controller 31 corresponding to one round of streaming as a recording action.

In this case, at step S101, first from a prescribed tape position before the position of recording start, processing for preliminary running of the magnetic tape is executed. And by advancing to step S102 during this preliminary run period before the start of recording, a frame AFN supposed to be the position of recording start (i.e. the ST-AFN) is identified, and the number of this ST-AFN is set as a "value A." Incidentally in the system controller 31, AFN information as the EOD stored in a prescribed memory area is supposed to be identifiable, and the above-mentioned ST-AFN can be found on the basis of this AFN as the EOD. After that, at step S103, control to start streaming from the position of recording start on the magnetic tape is executed. The position of recording start at this time, in a state in which data are already recorded by streaming, is where recording is started from the group of a required number in accordance with the rule shown in FIG. 18C.

At the time of recording, whereas processing to form data inputted from the interfacing section 1 into recorded data meeting the DDS4 format is supposed to be executed by the recording circuit system, the system controller 18, as processing of step S104, controls a subcode generating circuit 8 so that the value A (ST-AFN), set at step S102, be set in the area of the pack item area number 7 in the address/subcode area. This causes the ST-AFN according to the value A to be continually recorded as the pack item area number 7 of the address/subcode area of each track recorded as a result of recording start by the processing of step S103. Furthermore data as other pack item numbers than the pack item area number 7 (ST-AFN) (such data are partly shown in FIG. 13) are also recorded, as prescribed values are set in accordance with the process of recording tracks.

At step S105, it is determined whether or not recording is to be suspended (including termination of recording) in accordance with prescribed conditions and, if it is determined that no suspension of recording is needed, return to the processing of step S104 will be effected, thereby continuing the streaming. To add, if a recording error is detected by RAW executed during this processing period (during the streaming period), a rewrite is supposed to be performed in accordance with the rule explained with reference to FIG. 19A.

On the other hand, if it is determined at step S105 that recording should be suspended, by advancing to step S106, control on the magnetic tape driving system will be executed so that an action known as repositioning be executed. This repositioning is generally supposed to be an action to return to a position slightly before the final part of the recording done until then to stand by for recording, and after that, when a state permitting recording is achieved, recording is supposed to be resumed from the immediately following part.

Upon completion of the repositioning at step S106, by advancing to step S107, it is determined whether or not the determination to suspend recording at step S105 was based on a recording end command. Here, if the determination at step S107 gives an affirmative result, by advancing to step S109, a frame of EOD (End of Data) will be recorded following the final position of the area so far recorded, and one round of streaming will be thereby completed.

On the other hand, if at step 107 a negative result that the determination to suspend recording at step S105 was not based on a recording end command, by advancing to step S108, it will be determined whether or not a command for resumption of recording has been generated.

If at step S108 it is determined that no command for resumption of recording can be obtained, return to step S107 will take place. Here, processing by the loop of steps S107 and S108 is in a state of standing by for a recording end command or a recording resumption command to be obtained after the completion of repositioning.

On the other hand, if at step S108 it is determined that a recording resumption command has been obtained, return to the processing of step S101 will take place. Thus, one round of streaming is deemed to have been completed by the processing of the final step S105 at this stage, and by returning to the processing of step S101 the next round of streaming is started. This action at the start of streaming will conform to the rule explained with reference to FIG. 18C.

Taking place of such a recording action results in the recording, in the pack item area (the pack item number 7) in the address/subcode area of the track formed in every round of streaming, of the ST-AFN corresponding to that streaming recorded area.

(4-5. Processing for measurement of timing ATF servo reference value)

Figure 6:
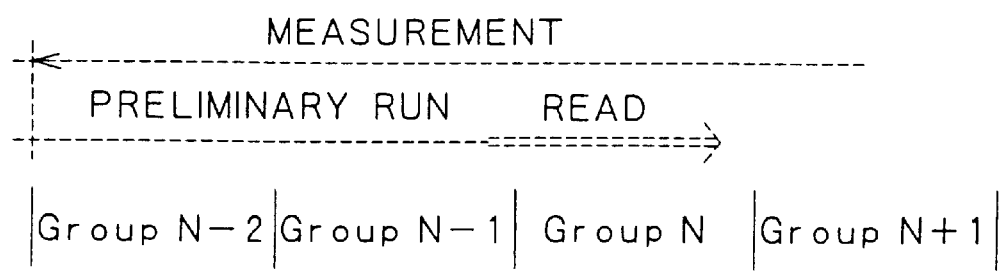
FIG. 6 is a diagram for describing the tape running state at the time of reference value measurement and of reproduction.

The processing for the measurement of the timing ATF servo reference value here, to be explained below, is supposed to be executed as repositioning as a preliminary stage for accomplishing reproduction from the group (N) as shown in FIG. 6, and the reference value is measured while scanning for measurement is taking place in a direction inverse to the group (N)→the group (N−1)→the group (N−2) in accordance with a properly set tape running speed on the basis of the earlier explained ground.

Figure 7:
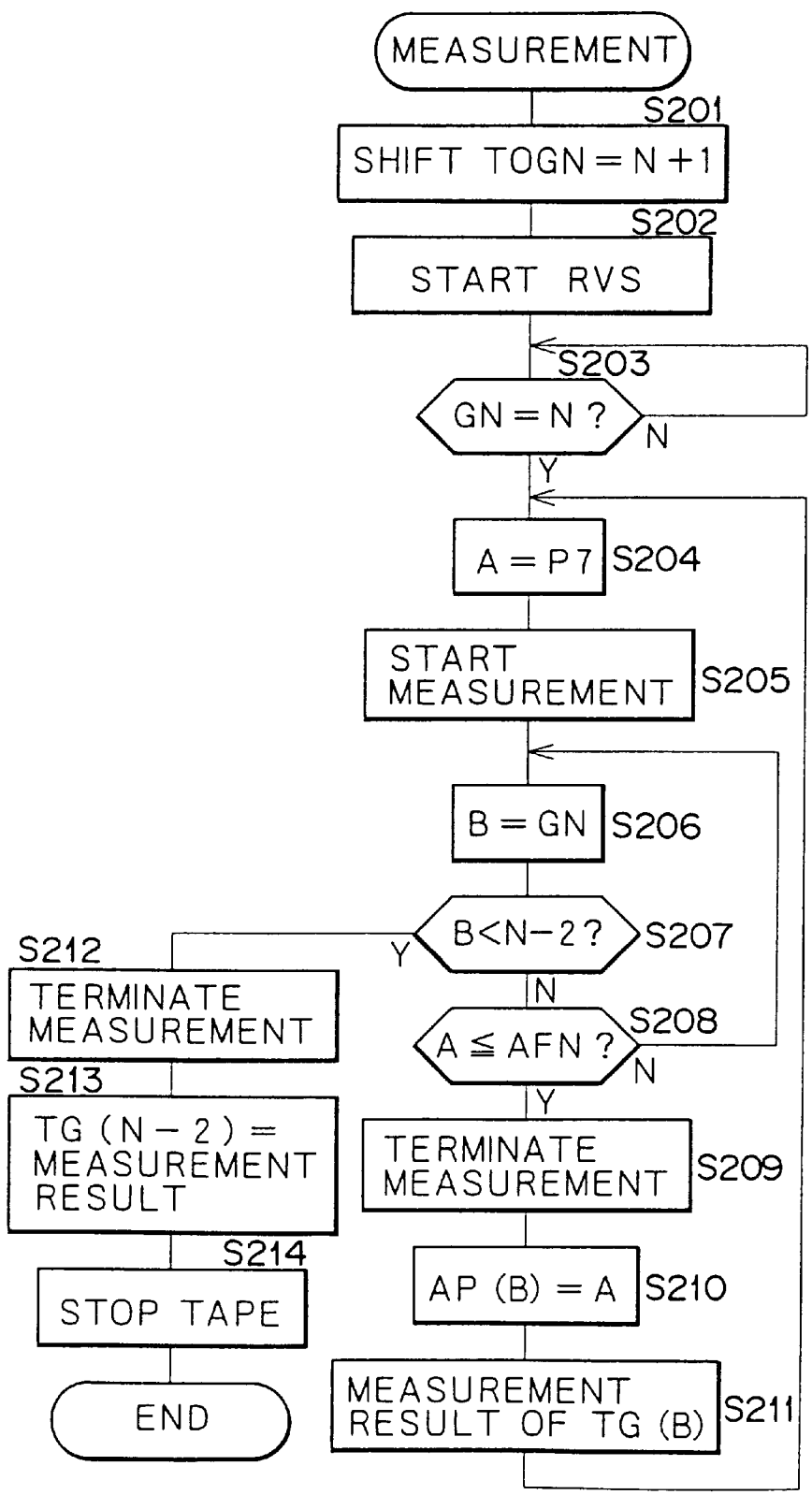
FIG. 7 is a flowchart showing the processing actions at the time of reference value measurement.

The flowchart of FIG. 7 shows processing by the system controller 31 for measuring the timing ATF servo reference value. Incidentally, codes given in this chart are defined as stated below.

GN: Current group number
N: Group number to be reproduced
P7: Data written at the subcode pack item number 7 (ST-AFN)
AFN: AFN of the current frame
AP(B): AFN of the leading frame of group B (when appended)
TG(B): Result of the measurement of the reference value in group B It is further supposed that the values of AP (N−2) to AP (N) obtained as AP(B) and TG(N−2) to TG (N) are initialized with '0' at a stage before the execution of processing shown in FIG. 7. However, if '0' is set with respect to TG(N−2) to TG(N) as the final result at the completion of the processing shown in FIG. 7, they are set to the same value as that of the immediately preceding group.

Incidentally, where a rewrite has been done in practice, if the write was done close to the final position in the group, the track may be recorded so as to let the GN (Group Number) in the pack item number 0 of the address/subcode area return, but here, for the convenience of description, it is assumed that no such result of recording is obtained.

In this case, first as a preliminary stage for the accomplishment of scanning for measurement from the group (N) control processing is executed at step S201 to move (run) the magnetic tape to a position where GN=N+1 is to be detected and, when the magnetic tape has been positioned at the group (N+1), as the processing of step S202, control is executed to accomplish scanning by a magnetic head, with the magnetic tape being run in the inverse direction (inverse scanning). The tape running speed at this time is a prescribed tape running speed for scanning for measurement set on the basis of the earlier described ground (e.g. an approximately 0.9 speed).

In a state where inverse scanning has been started from the group (N+1) at step S202, the system controller 31, as the processing of step S203, determines whether GN=N holds true with the current group on the basis of information on the address/subcode area read out by inverse scanning. Thus, a standby takes place until it is determined that the group set to start reproduction after the measurement has been accessed, and when it is determined that this group has been accessed, advancement to step S204 takes place.

At step 204, an ST-AFN (stored in the pack item area of the pack item number 7) read of the track by the current inverse scanning is set and held as the value A, and reference value measurement is started at the next step S205. Thus, processing to acquire samples of the tracking detection periods TDT (A) and TDT(B) (see FIGS. 4A to 4E), one obtained for each track scanned, is executed.

Upon the start of the aforementioned measurement, the system controller 31, as the processing of step S206, holds the GN to which the currently scanned track belongs as the value B, and at the following step S207 determines whether or not $$B<N-2$$

holds true. Thus it determines whether or not the group number to which the currently scanned track belongs refers to the group (N−2) with which the measurement is to be terminated.

If a negative result is obtained at step S207, by advancing to step S208, the value A currently held by the system controller 31 will be compared with the AFN read out from the track by scanning (stored in the pack item area SC3 of the pack item number 0), and it will be determined whether or not $$A<AFN$$

holds true. This is to determine whether or not the frame (track) supposed to be currently scanned is identical with the actual frame indicated by the AFN recorded in the frame (or has passed in the inverse direction). Thus, at step S208, it is determined whether or not the current frame (track) supposed to be currently scanned is the streaming start frame.

If a negative result is obtained at step S207, by returning to the processing of step S206, the processing to determine whether the current frame has reached the group (N−2) and the processing to determine whether the current frame (track) is the streaming start frame will be repeated.

On the other hand, if an affirmative result is obtained at step S208, it will be made definite that the current frame (track) supposed to be currently scanned is the streaming start frame. Thus, it is made definite that the starting position of this current frame (track) is an append point.

In this case, the system controller 31 proceeds to step S209, where the reference value measurement started at S205 is terminated. The processing at this time is to calculate the average of the samples of the tracking detection periods TDT(A) and TDT(B) so far obtained, and to set this calculated value as the reference value for the streaming recorded area so far scanned.

And the system controller 31 sets, at the following step S210:

$$AP(B)=A$$

Thus, the leading frame of the group (B), which is the leading group of streaming start, is indicated by the ST-AFN. This corresponds to processing to identify an append point and, when the actions up to this point are matched with FIG. 18B, instead of the frame according to LFN =1 of the group (B), the amble frame immediately following the normal append point at which streaming was actually started has been designated.

At the following step S211, the result of reference value measurement obtained at step S209 is set as the measured result TG(B) for the group (B), and this measured result is caused to be stored by, for instance, an internal RAM or the like of the system controller 31.

Here, with reference to FIG. 6 for example, in the case that the group (N−1)→the group (N) belong to the same streaming recorded area, the group (N−2) and the group (N−1) are appended to each other, and an append point exists on the boundary between them, whereas the measured result TG(N−1) for the group (N−1) is set, since the value of TG(N−2) to TG(N) is set to be the same as the value of the immediately preceding group where '0' is ultimately set as stated earlier, TG(N) for the group (N) belonging to the same streaming recorded area as the group (N−1) is eventually set to the same value as AP(N) and TG(N), and held in a RAM. This causes the group (N−1) and the group (N) to be treated as belonging to the same streaming recorded area, and the reference value for each group is set to the same value.

If, at step S207, an affirmative result is obtained, i.e. it is determined that the group number to which the currently scanned track belongs is the group (N−2) for which the measurement is set for termination, here, after at least sufficient tape running to obtain the required minimum of measurement samples is executed for the track constituting the group (N−2), the measurement will be terminated by advancing to step S212 (the advancing at this time is similar to step S209). At the following step S213, the measured result for TG (N−2) is set. The processing of this step S213 also is similar to the processing of step S211 earlier explained. And at step S214, tape running so far done for scanning for measurement is terminated, and the measurement is suspended. Incidentally, FIG. 6 illustrates a state in which, at the time of termination of the processing of step S214, the tape position is returned substantially to the leading position of the group (N−2).

The above-described actions cause a different reference value to be set for each section partitioned by an append point (streaming recorded area). Also, the position of an append point (AP (B)) is managed to match the AFN corresponding to that append point. This causes, as will be described next, the append point to be perceived on the basis of the AFN as the APB during reproduction, and enables the reference value for outputting from the reference register 68 to be switched for each streaming recorded area.

To add, for actual detection of an append point, combined use of the frame pattern-based detection method utilizing LFN as described above is also conceivable. Further, the measurement illustrated in FIG. 6 is no more than conceptual, but in practice measurement can be accomplished over a broader range of recording areas, i.e. a greater number of groups.

(4-6. Processing for reproduction)

Next, the processing to realize the reproduction after the execution of the above-described measurement will be described with reference to the flowchart of FIG. 8. Here again, the description will refer to a case where, as shown in FIG. 6, the preliminary run is started from group (N−2) and data are read out from the group (N) onward.

For reproduction processing illustrated in FIG. 8, in a state where preliminary tape running has been started from group (N−2), first at step S301 a reference value (TARGET)=TG(N−2) is set into the reference value register 68. This causes, first, a reference value corresponding to the group (N−2) to be outputted from the reference value register 68, and the preliminary running period for the group (N−2) is placed under tracking control on the basis of this reference value.

At the following step S302, it is determined whether $$AP(N-1)=0$$

holds. According to the measurement processing illustrated in FIG. 7, for the group (B) which has no append point in its leading position, AP(B)=0 is set. Therefore, at step S302, it is determined whether or not an append point corresponding to the starting position of the group (N−1) exists or not. Here, if no append point exists, advancement to step S305 will take place, but if an append point is determined to be present, advancement to step S303 will take place At step S303, regarding the AFT read out of the track by scanning the magnetic tape in preliminary running, it is determined whether or not $$AFN<AP(N-1)$$

holds, and as long as a negative result is obtained, this processing is continued. Thus a standby is continued until the track currently scanned in preliminary running comes to the frame positioned immediately following the append point corresponding to the starting position of the group (N−1). And when AFN=AP(N−1) comes to hold and it is determined that the scanned track has come to the frame positioned immediately following the append point corresponding to the starting position of the group (N−1), by advancing to step S304, the reference value (TARGET)=TG(N−1) is set into the reference register 68. This causes the reference value outputted from the reference value register 68 to be switched from the reference value corresponding to the group (N−2) to that corresponding to the group (N−1), and the preliminary running period for the group (N−1) is placed under tracking control on the basis of this reference value.

At step S305, it is determined whether or not $$AP(N-1)=0$$

holds, i.e. whether or not an append point exists corresponding to the starting position of the group (N), and if no append point exists, advancement to step S308 will take place, but if it is determined that an append point does exist, advancement to step S306 will take place.

At step S306, regarding the AFN read out of the track by scanning the magnetic tape in preliminary running, it is determined whether or not $$AFN<AP(N)$$

holds, and as long as a negative result is obtained, this processing is continued. Thus, here again, a standby is continued until the track currently scanned in preliminary running comes to the frame positioned immediately following the append point corresponding to the starting position of the group (N).

And once it is determined that the state of AFN=AP(N) is achieved and the track being scanned has come to the frame positioned immediately following the append point corresponding to the starting position of the group (N), by advancing to step S307, the reference value (TARGET)=TG(N) is set into the reference register 68. This causes the output of the reference value register 68 to be switched from the reference value up to this point to that corresponding to the group (N).

At step S308, the group (N) is reproduced. At this time, in accordance with the sequence of processing up to step S307 referred to above, tracking control is accomplished on the basis of the reference value finally set into the reference value register 68.

Reproduction in the manner described above results in switching to a reference value obtained by measurement of each append point (streaming recorded area), and it is made possible to execute tracking control appropriately on recorded areas wherein streaming recorded areas are consecutively formed.

To add, although the above-described embodiment is supposed to conform to the DDS4 format, the present invention can be applied to any recording/reproducing apparatus using a timing ATF system.

As hitherto described, according to the present invention, first track identifying information (AFN) capable of identifying tracks and second track identifying information (ST-AFN) capable of identifying, with respect to tracks each of which is formed for a round of streaming from the time a recording tape medium starts running and until the end of running, the track on which this round of streaming started are recorded on the recording tape medium on a track-by-track basis. And, its configuration to identify the section of a streaming recorded area (the append point) on the basis of the aforementioned AFN and ST-AFN when the reference value for timing ATF servo is to be measured makes it possible to detect the section of the streaming recorded area with greater certainty than to detect it depending solely on, for instance, the pattern of the array of frame numbers (LFNs) in the group.

If, for instance, a rewrite is done in the vicinity of the final position of a group, the LFN array pattern will be complex, but even in such a situation, the invention can fully maintain its certainty of detection by using determination on the basis of AFNs equivalent to serial numbers for frames.

Moreover, the reference value measured for each streaming recorded area on the basis of the aforementioned detection result becomes more reliable, and eventually a highly accurate tracking control state can be achieved at the time of reproduction.

Furthermore, the enhanced certainty of the detection of streaming recorded areas, for instance, reduces the probability of error occurrence in the detection of the sections of streaming recorded areas, and the opportunities to have retrying actions executed become correspondingly fewer. This makes possible, in almost every case, smooth shifting from reference value measurement to the ensuing data reproduction, and improvement of the reliability of reproduction.

What is claimed is:

1. A recording tape medium, on which are recorded:
    tracks formed by a helical scanning system each corresponding to a prescribed unit of data recorded on said medium;

first track identifying information for identifying each of said tracks; and second track identifying information for identifying an initial track of each session of a recording operation recorded on said medium, wherein each track of said each session includes an area for storing said second track identifying information.

2. A recording tape medium as claimed in claim 1, wherein:

each of said tracks includes a main data area comprising a plurality of fragments; and each fragment comprises a subcode area for storing said first track identifying information and a data area for recording data from a host computer.

3. A recording tape medium as claimed in claim 1, wherein said second track identifying information comprises a frame number indicating a frame comprising a pair of said tracks.

4. A recording tape medium on which are recorded:

tracks formed by a helical scanning system each corresponding to a prescribed unit of data recorded on said medium;

first track identifying information for identifying each of said tracks; and second track identifying information for identifying an initial track of each session of a recording operation recorded on said medium, wherein each of said tracks includes a main data area comprising a plurality of fragments, each fragment comprises a subcode area for storing said first track identifying information and a data area for recording data from a host computer, and said second track identifying information is stored in said subcode area.

5. A recording apparatus for recording data in prescribed units of data each corresponding to a track recorded by a helical scanning system on a recording tape medium, comprising:

first generating means for generating first track identifying information for identifying individual tracks on said recording tape medium;

second generating means for generating second track identifying information for identifying an initial track of each session of a recording operation; and unit data forming means for forming said units of data by inserting the first track identifying information and the second track identifying information into each corresponding unit of data.

6. A recording apparatus as claimed in claim 5, wherein said unit data forming means inserts track position information corresponding to each unit of data into said units of data.

7. A recording apparatus as claimed in claim 5, wherein a unit of recording operation is initiated while the recording tape medium is in motion.

8. A recording apparatus as claimed in claim 5, wherein:

each of said units of data comprises a plurality of frames;

each of said frames comprises a pair of said tracks; and said second track identifying information of each track comprises a frame number.

9. A recording apparatus as claimed in claim 8, wherein:

the frame number of each track in a unit of data corresponds to the frame number of a track contained in the immediately preceding unit of data when a recording operation is initiated at one of said units of data.

10. A recording apparatus as claimed in claim 8, wherein:

the frame number of each track in a unit of data corresponds to a specific frame number indicating the absence of a recording start point in said unit of data when no recording operation is initiated at said unit of data.

11. A reproduction apparatus for reproducing data from tracks recorded on a recording tape medium by a helical scanning system, comprising:

measuring means for measuring a tracking detection period from a time a rotary drum provided with a reproducing head is in a reference phase position in a period of one rotation to a time said head performs reproduction in a prescribed position on a track;

detecting means for detecting a tracking error signal by comparing the measured value of said tracking detection period with a preset reference value;

means for generating, based on said tracking error signal, a servo control signal for a relative speed with respect to a running speed of said recording tape medium and a rotating speed of the rotary drum; and setting means for setting said reference value by reading out, from said track, identifying information indicating a position where a recording operation session is initiated in a state wherein said recording tape medium is in motion.

12. A reproduction apparatus as claimed in claim 11, wherein:

each of said tracks comprises a main data area comprising a plurality of fragments; and each fragment comprises a subcode area wherein said identifying information is stored, and a data area wherein data from a host computer are stored.

13. A reproduction apparatus as claimed in claim 11, further comprising memory means for storing said reference value corresponding to said identifying information.

14. A measuring apparatus for measuring, while reproducing data from a track recorded on a recording tape medium by a helical scanning system, a tracking detection period from the time a rotary drum provided with a reproducing head is in a reference phase position in a period of one rotation until the time the head performs reproduction in a prescribed position on the track; and measuring a reference value, wherein first and second identifying information are recorded on each track, said first track identifying information identifying individual tracks and said second track identifying information identifying the track on which a recording operation session is initiated in a state wherein said recording tape medium is in motion, said measuring apparatus comprising:

tape running control means for causing said recording tape medium to run at a prescribed running speed for obtaining said reference value;

reference value setting means for sampling measured values of a plurality of said tracking detection periods obtained in a state in which said recording tape medium is running, calculating the tracking detection period in a just tracking phase state based on the plurality of measured values, and setting the result of said calculation as said reference value;

unit recorded area identifying means for identifying sections of unit recorded areas recorded by said recording operation session based on said first and second track identifying information read from said recording tape medium in a state wherein said recording tape medium is running; and control means for causing a setting action to be executed by said reference value setting means for each identified unit recorded area.

15. A measuring apparatus as claimed in claim 14, wherein said tape running control means causes said recording tape medium to run at a speed n/m times a standard speed when said measuring apparatus is measuring said reference value, wherein:

n is an integer;

$m \leq Z$;

Z is the number of times said reproducing head can scan a track within a period of time allocated for measuring said reference value; and n/m is a non-integer.

16. A measuring apparatus as claimed in claim 14, wherein said tape running control means causes said recording tape medium to run in an inverse direction when said measuring apparatus is measuring said reference value.

* * * * *